(12) United States Patent
Chen et al.

(10) Patent No.: US 11,474,716 B2
(45) Date of Patent: Oct. 18, 2022

(54) METHOD, DEVICE, AND COMPUTER PROGRAM PRODUCT FOR CREATING STRIPE IN STORAGE SYSTEM

(71) Applicant: EMC IP Holding Company LLC, Hopkinton, MA (US)

(72) Inventors: Michael Chen, Chengdu (CN); Huijuan Fan, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 17/036,560

(22) Filed: Sep. 29, 2020

(65) Prior Publication Data

US 2022/0066663 A1    Mar. 3, 2022

(30) Foreign Application Priority Data

Aug. 27, 2020  (CN) .......................... 202010878372.X

(51) Int. Cl.
*G06F 3/06* (2006.01)

(52) U.S. Cl.
CPC .......... *G06F 3/0631* (2013.01); *G06F 3/0604* (2013.01); *G06F 3/0616* (2013.01); *G06F 3/0649* (2013.01); *G06F 3/0653* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 10,146,624 B1 * | 12/2018 | Gong | G06F 11/2058 |
| 10,482,071 B1 * | 11/2019 | Shalev | G06F 3/0689 |
| 10,761,933 B2 | 9/2020 | Moore et al. | |
| 10,783,038 B2 | 9/2020 | Moore et al. | |

(Continued)

OTHER PUBLICATIONS

U.S. Appl. No. 16/671,824 filed in the name of Lior Kamran et al. on Nov. 1, 2019, and entitled "Storage System Capacity Expansion Using Mixed-Capacity Storage Devices."

(Continued)

*Primary Examiner* — Prasith Thammavong
*Assistant Examiner* — Edmund H Kwong
(74) *Attorney, Agent, or Firm* — Ryan, Mason & Lewis, LLP

(57) ABSTRACT

A method, a device, and a computer program product for creating a stripe in a storage system. In the method, a balance index of a storage device in multiple storage devices in the storage system is determined. Here, the balance index indicates a relationship between the state distribution of a set of stripes which have been allocated for use in the storage device and the state distribution of a set of stripes which have been allocated for use in the multiple storage devices. An influence factor for the balance index of the storage device in the multiple storage devices is determined according to attributes of the storage device in the multiple storage devices. A storage device for creating a stripe is selected from the multiple storage devices based on the determined balance index and the determined influence factor. One extent in the selected storage device is added to the stripe.

20 Claims, 11 Drawing Sheets

(56) References Cited

U.S. PATENT DOCUMENTS

| | | | |
|---|---|---|---|
| 2013/0145091 A1* | 6/2013 | Klemm | G06F 3/0631 |
| | | | 711/E12.002 |
| 2015/0268872 A1* | 9/2015 | Ding | G06F 3/0616 |
| | | | 711/103 |
| 2018/0018096 A1* | 1/2018 | Fekete | G06F 3/0689 |
| 2018/0081571 A1* | 3/2018 | Akshara | G06F 3/0689 |
| 2019/0339897 A1* | 11/2019 | Ash | G06F 3/0644 |
| 2020/0097174 A1 | 3/2020 | Moore et al. | |
| 2020/0097363 A1 | 3/2020 | Moore et al. | |
| 2020/0097393 A1 | 3/2020 | Moore et al. | |
| 2020/0301829 A1* | 9/2020 | Somech | G06F 3/0608 |

OTHER PUBLICATIONS

U.S. Appl. No. 16/793,163 filed in the name of Yosef Shatsky et al. on Feb. 18, 2020 and entitled "Storage System with Efficient Data and Parity Distribution Across Mixed-Capacity Storage Devices."

* cited by examiner

METHOD, DEVICE, AND COMPUTER PROGRAM PRODUCT FOR CREATING STRIPE IN STORAGE SYSTEM

RELATED APPLICATION(S)

The present application claims priority to Chinese Patent Application No. 202010878372.X, filed Aug. 27, 2020, and entitled "Method, Device, and Computer Program Product for Creating Stripe in Storage System," which is incorporated by reference herein in its entirety.

FIELD

Implementations of the present disclosure relate to storage management, and more particularly, to a method, a device, and a computer program product for creating a stripe in a storage system.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and the response time of storage systems. At present, various data storage systems based on the Redundant Array of Independent Disks (RAIDs) have been developed to improve data reliability. When one or more disks in a storage system fail, data in the failed disks can be reconstructed from data on other normally operating disks.

Mapped RAID has been developed at present. In mapped RAID, a disk is a logical concept and may include multiple extents. Multiple extents included in a logical disk can be distributed on different physical storage devices in a resource pool. For multiple extents in one stripe of the mapped RAID, the multiple extents should be distributed on different physical storage devices. This makes it possible to perform, when a physical storage device where one of the multiple extents is located fails, a reconstruction operation to recover data from physical storage devices where other extents are located. It will be understood that the storage devices here may have the same or different sizes. At this moment, when selecting extents from multiple storage devices for creating a stripe, how to ensure the load balance among the storage devices becomes a technical problem.

SUMMARY

Therefore, illustrative embodiments herein develop and implement a technical solution for managing stripes in a storage system in a more effective manner. It is expected that the technical solution can be compatible with existing storage systems, and can manage stripes in a storage system in a more effective manner by modifying various configurations of existing storage systems.

According to a first aspect of the present disclosure, a method for creating a stripe in a storage system is provided. The storage system includes multiple storage devices. This method includes: determining a balance index of a storage device in the multiple storage devices. Here, the balance index indicates a relationship between the state distribution of a set of stripes which have been allocated for use in the storage device and the state distribution of a set of stripes which have been allocated for use in the multiple storage devices. An influence factor for the balance index of the storage device in the multiple storage devices is determined according to attributes of the storage device in the multiple storage devices. A storage device for creating a stripe is selected from the multiple storage devices based on the determined balance index and the determined influence factor. One extent in the selected storage device is added to the stripe.

According to a second aspect of the present disclosure, an electronic device is provided, including: at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings.

DETAILED DESCRIPTION

Hereinafter, illustrative embodiments of the present disclosure will be described in more detail with reference to the accompanying drawings. Although the illustrative embodiments of the present disclosure are shown in the accompanying drawings, it should be understood that the present disclosure may be implemented in various forms and should not be limited by the embodiments set forth herein. Rather, these embodiments are provided so that the present disclosure will be more thorough and complete, and the scope of the present disclosure will be fully conveyed to those skilled in the art.

As used herein, the term "include" and variations thereof mean open-ended inclusion, that is, "including but not limited to." Unless specifically stated, the term "or" indicates "and/or." The term "based on" means "based at least in part on." The terms "one example implementation" and "one implementation" mean "at least one example implementation." The term "another implementation" means "at least one further implementation." The terms "first," "second," etc. may refer to different or the same objects. Other explicit and implicit definitions may also be included below.

In the context of the present disclosure, a storage system may be a RAID-based storage system. The RAID-based storage system may combine multiple storage devices into one disk array. By providing redundant storage devices, the reliability of an entire disk group may greatly exceed that of a single storage device. RAID may provide various advantages over a single storage device, such as enhanced data integration, enhanced fault tolerance, increased throughput or capacity, and so on. There are multiple standards for RAID, such as RAID-1, RAID-2, RAID-3, RAID-4, RAID-5, RAID-6, RAID-10, RAID-50, and so on.

Figure 1A:
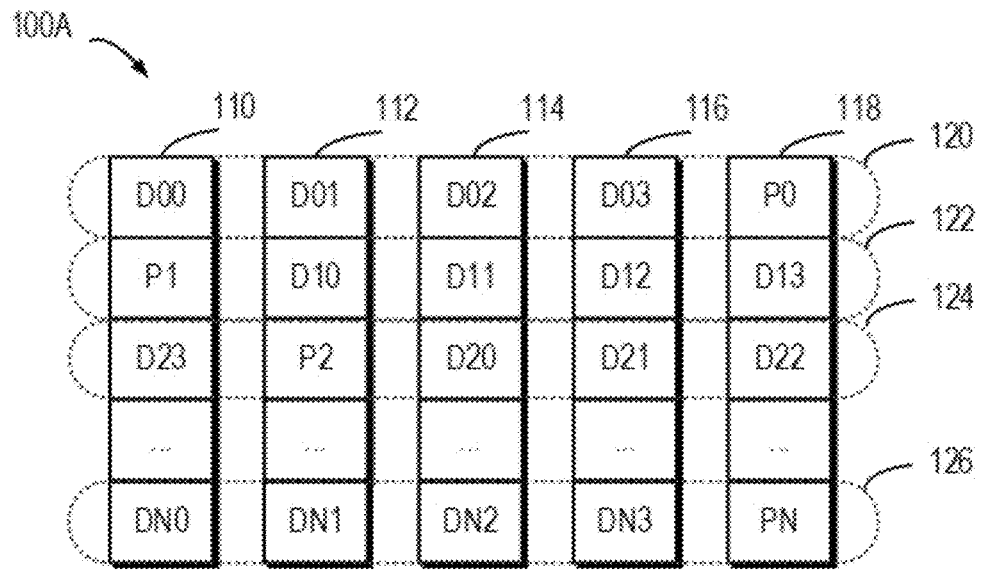
FIGS. 1A and 1B respectively schematically illustrate block diagrams of a storage system in which implementations of the present disclosure may be implemented.

FIG. 1A schematically illustrates a schematic diagram of storage system 100A in which a method of the present disclosure may be implemented. In the storage system shown in FIG. 1A, a RAID-5 (4D+1P, where 4D indicates that the storage system includes four storage devices for storing data, and 1P indicates that the storage system includes one storage device for storing a P parity) array including five independent storage devices (110, 112, 114, 116, and 118) is used as an example to illustrate the working principle of RAID. It should be noted that although five storage devices are schematically illustrated in FIG. 1A, more or fewer storage devices may also be included in other implementations depending on different RAID levels. Although stripes 120, 122, 124, . . . , 126 are shown in FIG. 1A, an RAID system may also include different numbers of stripes in other examples.

In RAID, a stripe may span multiple physical storage devices (e.g., stripe 120 spans storage devices 110, 112, 114, 116, and 118). Stripe may be simply understood as a storage area that satisfies a certain address range in the multiple storage devices. Data stored in stripe 120 includes multiple parts: data block D00 stored on storage device 110, data block D01 stored on storage device 112, data block D02 stored on storage device 114, data block D03 stored on storage device 116, and data block P0 stored on storage device 118. In this example, data blocks D00, D01, D02, and D03 are stored data, while data block P0 is the P parity of the stored data.

The manner in which data is stored in other stripes 122 and 124 is also similar to that in stripe 120, except that parities related to other data blocks may be stored on a storage device different from storage device 118. In this way, when one of multiple storage devices 110, 112, 114, 116, and 118 fails, the data in the failed device may be recovered from other normal storage devices.

Figure 1B:
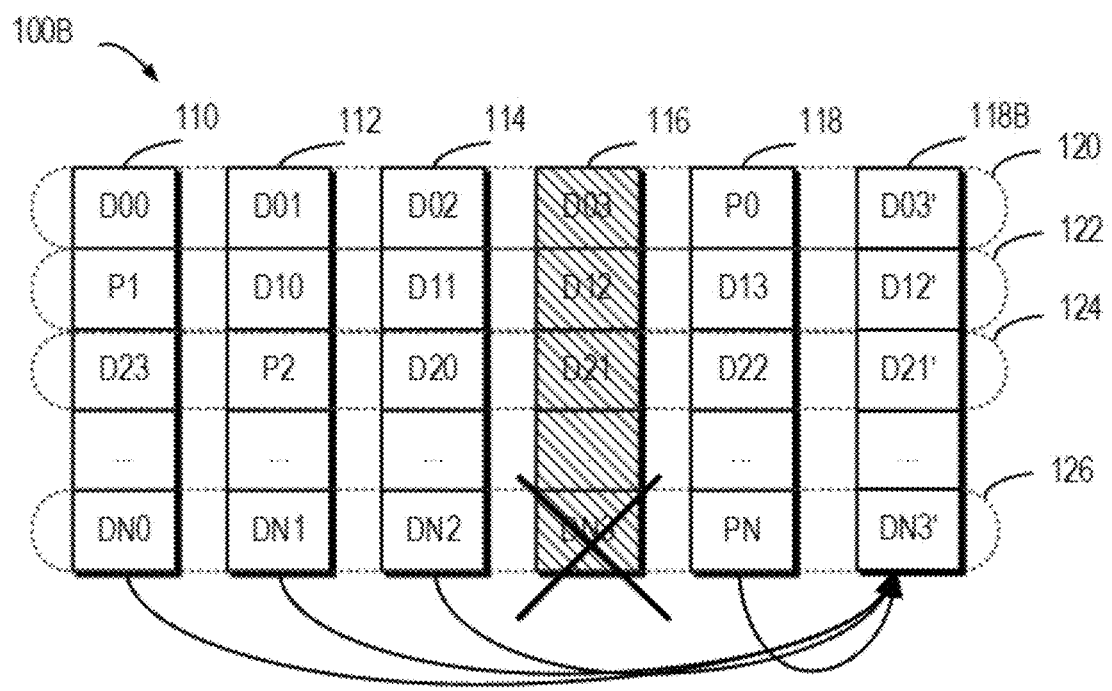

FIG. 1B schematically illustrates schematic diagram 100B of a reconstruction process of storage system 110A. As shown in FIG. 1B, when one storage device (for example, storage device 116 shown in hatching) fails, data may be recovered from multiple remaining storage devices 110, 112, 114, and 118 that operate normally. In this case, new backup storage device 118B may be added into RAID to replace storage device 118. In this way, the recovered data may be written to 118B and the system may be reconstructed.

It should be noted that although a RAID-5 storage system including five storage devices (wherein four storage devices are for storing data and one storage device is for storing the parity) is described above with reference to FIGS. 1A and 1B, according to definitions of other RAID levels, there may also be storage systems that include other numbers of storage devices. For example, based on the definition of RAID-6, two storage devices may be used to store parities P and Q respectively. For another example, based on the definition of a triple-parity RAID, three storage devices may be used to store parities P, Q, and R respectively.

Figure 2:
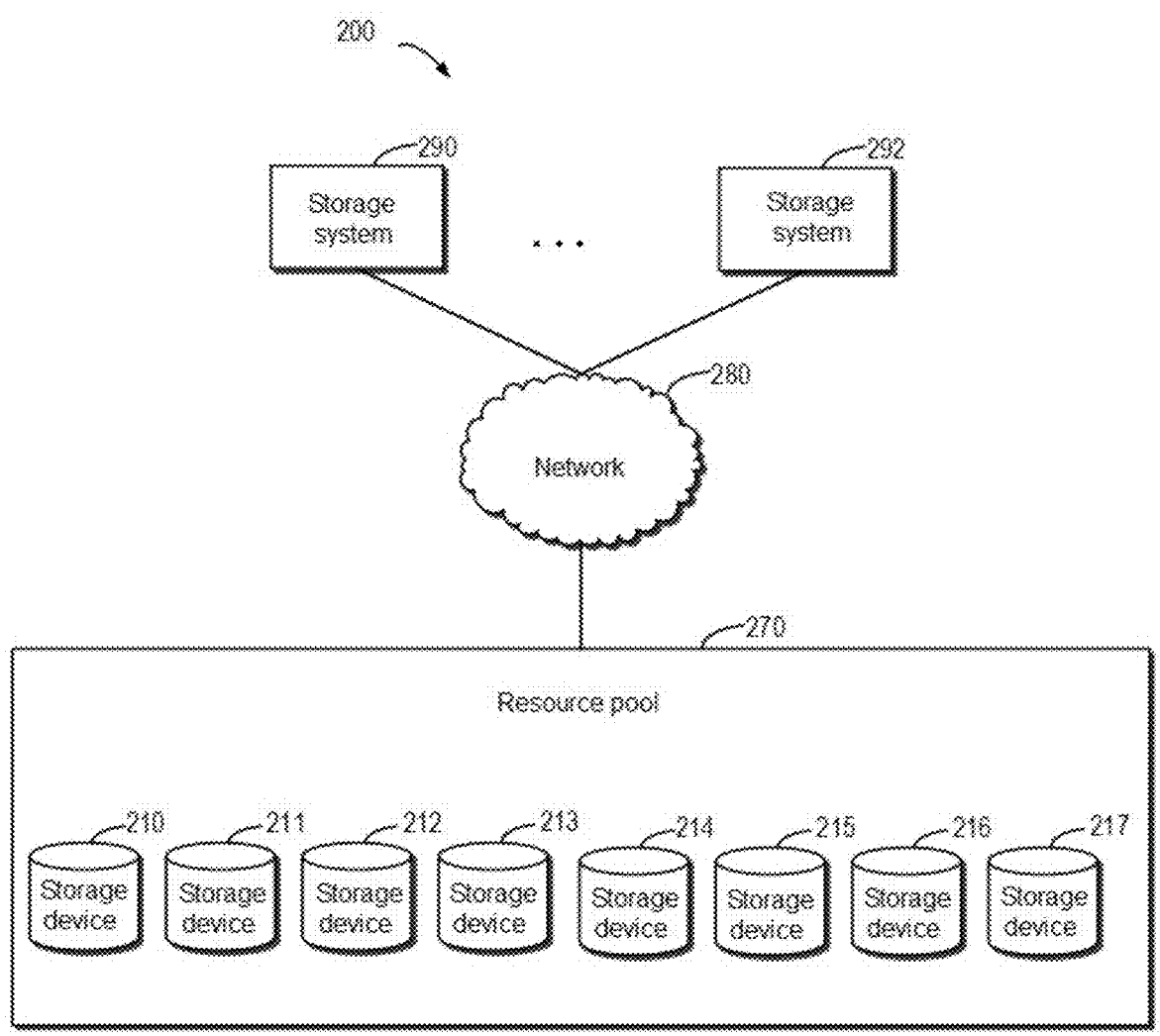
FIG. 2 schematically illustrates a block diagram of an example environment in which implementations of the present disclosure may be implemented.

With the development of distributed storage technologies, storage devices 110, 112, 114, 116, and 118 in the storage system shown in FIGS. 1A and 1B may no longer be limited to physical storage devices, but may be virtual storage devices. For example, all extents on storage device 110 may respectively come from different physical storage devices (hereinafter simply referred to as storage devices) in a resource pool. FIG. 2 schematically illustrates a block diagram 200 of an example environment in which a method of the present disclosure may be implemented. As shown in FIG. 2, storage resource pool 270 may include multiple physical storage devices 210, 211, 212, 213, 214, 215, 216, and 217. In this case, storage spaces in the multiple storage devices may be allocated to multiple storage systems 290, . . . , 292 of users. In this case, storage systems 290, . . . , 292 of users may access the storage spaces in all the storage devices in storage resource pool 270 via network 280. It will be understood that although FIG. 2 only schematically illustrates the case where storage resource pool 270 includes eight storage devices, according to an example implementation of the present disclosure, storage resource pool 270 may also include more or fewer storage devices.

Figure 3:
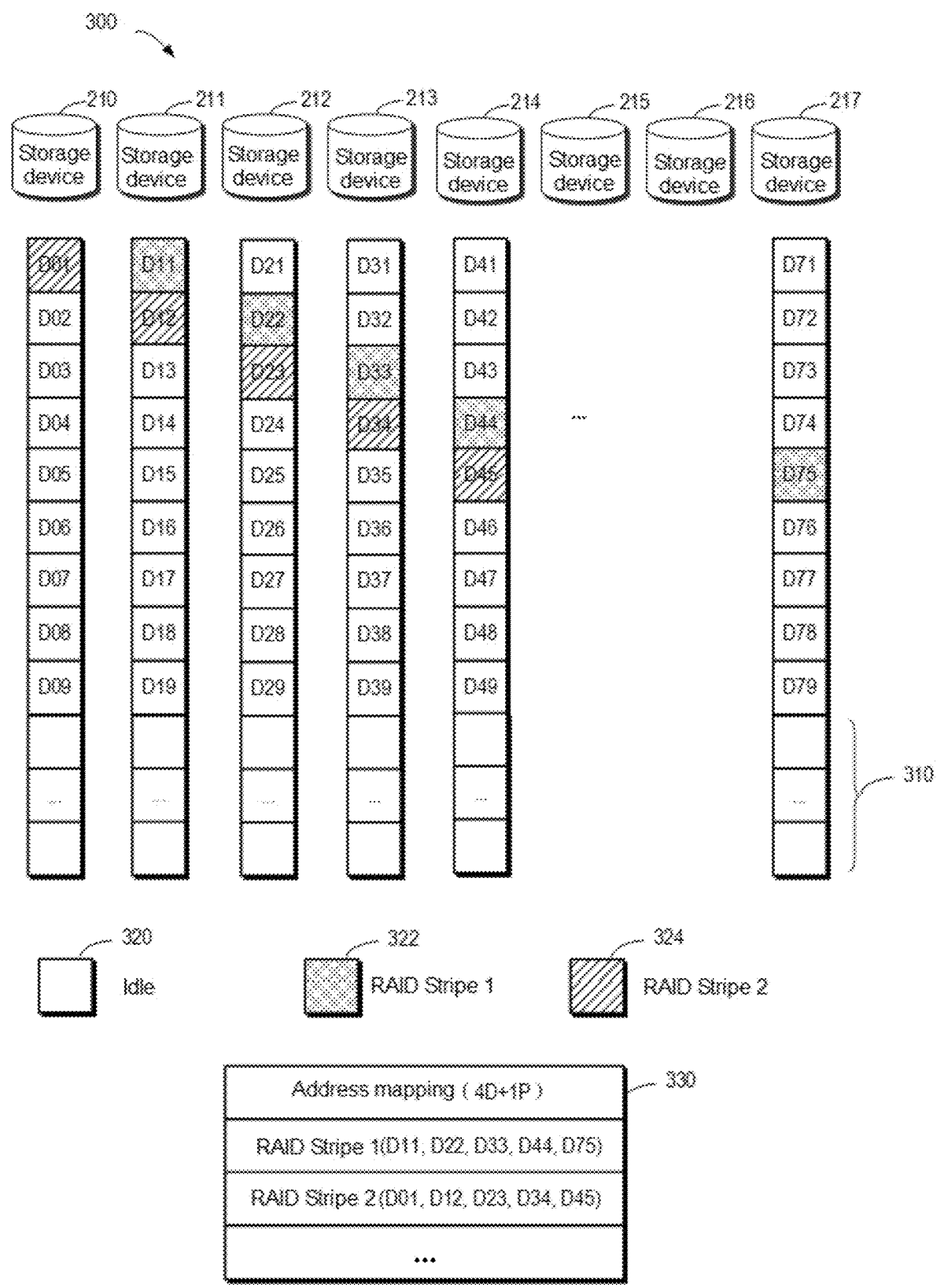
FIG. 3 schematically illustrates a diagram of a storage resource pool in FIG. 2.

FIG. 3 schematically illustrates a diagram 300 of more information of storage resource pool 270 shown in FIG. 2. Resource pool 270 may include multiple storage devices 210 to 217. Each storage device may include multiple extents, where legend 320 indicates an idle extent, legend 322 indicates an extent for RAID stripe 1, and legend 324 indicates an extent for RAID stripe 2. In this case, extents D11, D22, D33, and D44 for RAID stripe 1 are used to store data blocks of the stripe respectively, and extent D75 is used to store a parity of data. Extents D01, D12, D23, and D34 for RAID stripe 2 are used to store data blocks of the stripe respectively, and extent D45 is used to store a parity of data.

As shown in FIG. 3, address mapping 330 shows an association relationship between stripes and addresses of extents in the stripes. For example, RAID stripe 1 may include five extents: D11, D22, D33, D44, and D75, and these five extents are located in storage devices 211, 212, 213, 214, and 217, respectively. Specifically, as shown in FIG. 3, extent D11 is the first extent in storage device 211, and extent D22 is the second extent in storage device 212. As shown in FIG. 3, there may also be reserved idle part 310 in each storage device, so that when one storage device in the resource pool fails, extents in idle part 310 in each storage device may be selected to reconstruct all extents in the failed storage device.

It should be noted that FIG. 3 only uses a 4D+1P RAID-5 storage system as an example to show how the extents in the stripes are distributed in the multiple storage systems in the resource pool. When another RAID level is adopted, those skilled in the art can implement specific details based on the above principles. For example, in a 6D+1P+1Q RAID-6 storage system, 8 extents in each stripe may be distributed on multiple storage devices.

At present, a technical solution for creating a stripe according to the workloads of the storage devices has been proposed. It will be understood that multiple storage devices in the storage system may have different attributes. Existing technical solutions fail to consider the difference between the attributes of various storage devices, and thus cannot effectively ensure the load balance of the storage system.

In order to at least partially solve the above problem, according to an example implementation of the present disclosure, a technical solution for creating a stripe based on balance indexes and attributes of storage devices is proposed. Specifically, the balance index indicates a relationship between the state distribution of a set of stripes involved by a storage device and the state distribution of a set of stripes involved by multiple storage devices. With the operation of the storage system, workloads of the multiple storage devices will vary, which will result in a large difference in the balance indexes of the storage devices. Uneven balance indexes may cause the utilization rate and read/write volume of some storage devices to be much higher than other storage devices and cause an access bottleneck. This will greatly affect the operating efficiency of the storage system.

Figure 4:
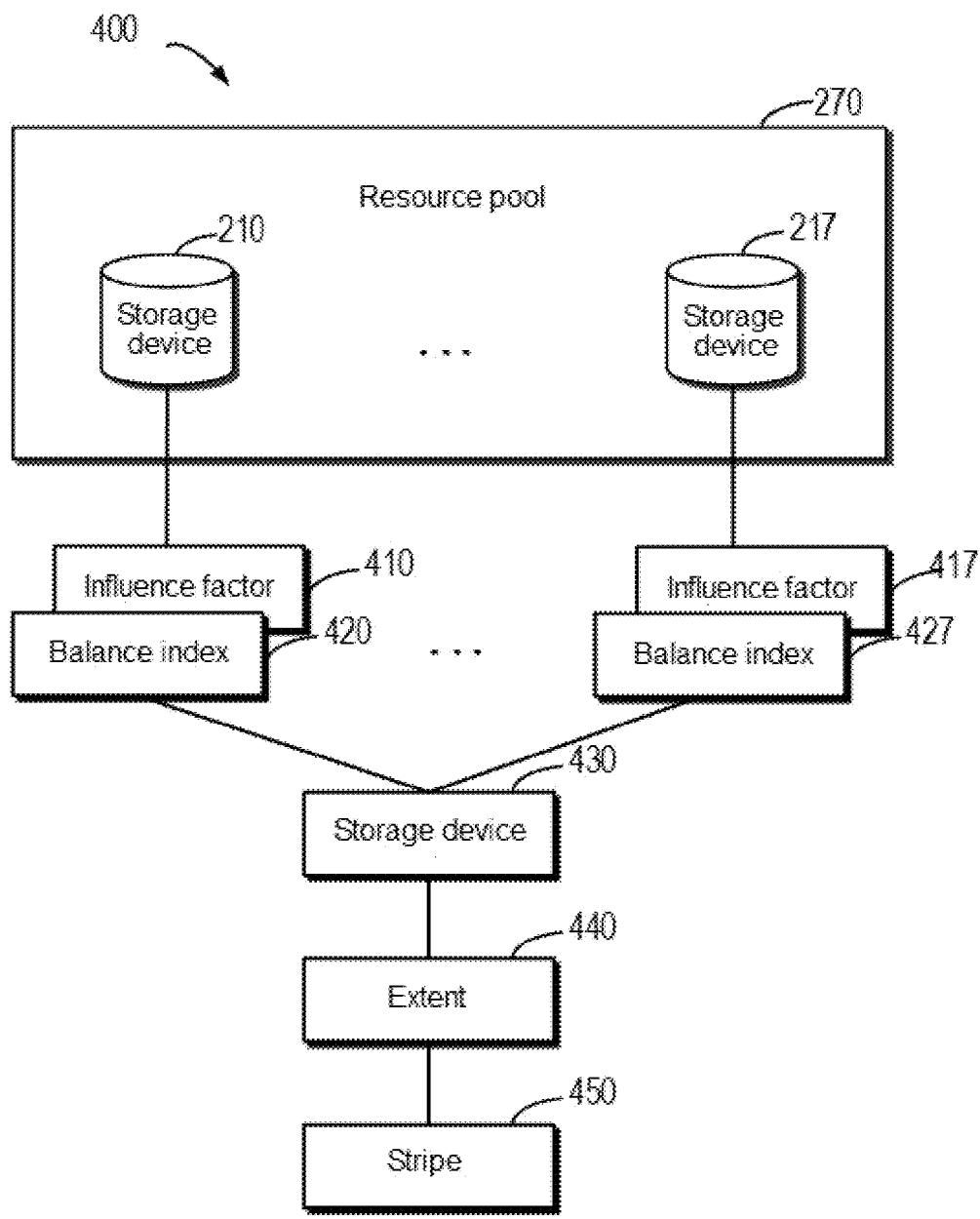
FIG. 4 schematically illustrates a block diagram of a process for creating a stripe in a storage system according to an implementation of the present disclosure.

For the convenience of description, more details of example implementations of the present disclosure will be described below by only taking a storage system including a 4D+1P RAID stripe as an example. FIG. 4 schematically illustrates block diagram 400 of a process for creating a stripe in a storage system according to an implementation of the present disclosure. As shown in FIG. 4, resource pool 270 of the storage system may include multiple storage devices 210 to 217. Balance indexes 420 to 427 of respective storage devices of the multiple storage devices may be determined, respectively. Furthermore, influence factors 410 to 417 of respective storage devices can be determined according to the attributes of each storage device.

In the case where the balance index and the influence factor of each storage device have been determined, storage device 430 may be selected from the multiple storage devices 210 to 217 based on the balance indexes and the influence factors. Then, idle extent 440 may be selected from storage device 430 to create stripe 450. Extent 440 may be used as a first extent and added to stripe 450. Hereinafter, more details of an example implementation of the present disclosure will be described with reference to FIG. 5.

Figure 5:
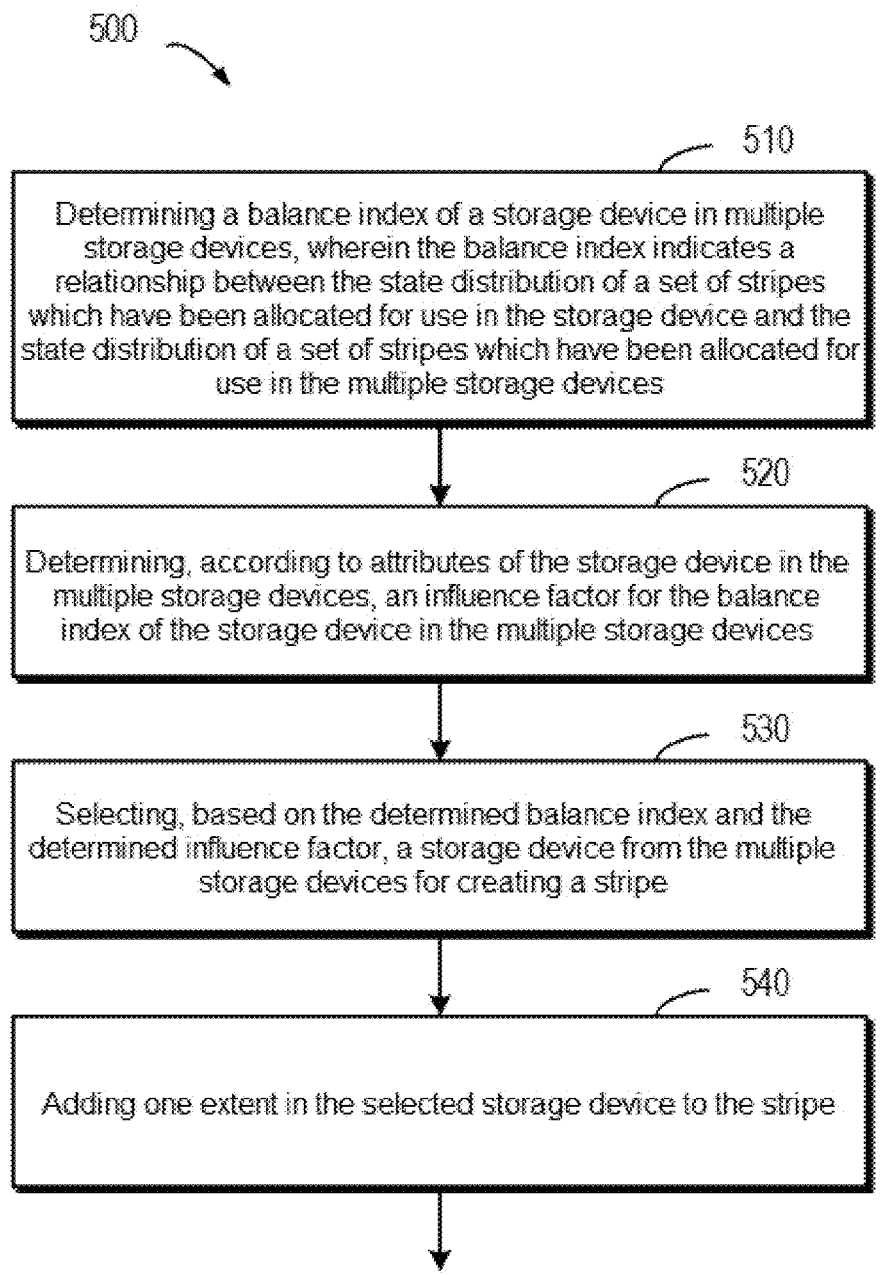
FIG. 5 schematically illustrates a block diagram of a method for creating a stripe in a storage system according to an implementation of the present disclosure.

FIG. 5 schematically illustrates a block diagram of method 500 for creating a stripe in a storage system according to an implementation of the present disclosure. At block 510, a balance index of a storage device in multiple storage devices is determined. Here, the balance index indicates a relationship between the state distribution of a set of stripes which have been allocated for use in the storage device and the state distribution of a set of stripes which have been allocated for use in the multiple storage devices. According to an example implementation of the present disclosure, method 500 may be performed when a request to create a stripe in a storage system is received.

The 4D+1P RAID stripe includes 5 extents, and data in the 5 extents is accessed in association. This results in an increase in the access volumes of 5 storage devices respectively including the 5 extents. In summary, for any two storage devices, the more stripes the two storage devices serve together, the greater the possibility that the two storage devices are accessed simultaneously, and the higher the workloads of the two storage devices. Therefore, two storage devices should be prevented from serving too many stripes at the same time.

According to an example implementation of the present disclosure, the balance index of a storage device can be determined based on a correlation of the storage device. In the context of the present disclosure, M is used to indicate the number of storage devices in the storage system, and N is used to indicate the width of a stripe. Assuming that the storage system includes 8 storage devices 210 to 217, then M=8 at this moment. When a 4D+1P RAID is adopted, N=4+1=5. In the following, the concept of the correlation between two storage devices is first introduced. For the ith storage device and the jth storage device (i≠j) in the multiple storage devices, the correlation between the two storage devices can be expressed as $\gamma_{Disk\ i, Disk\ j}$. According to an example implementation of the present disclosure, the correlation of a storage device with respect to itself can be set as 0, that is, $\gamma_{Disk\ i, Disk\ i} = 0$.

It will be understood that, at an initial stage of operation of the storage system, the storage system does not include any stripe, and at this moment, 5 extents from any 5 storage devices may be selected to create a stripe. After the storage system runs for a period of time, the storage system may include a set of stripes that have been created. At this moment, the number of stripes, which simultaneously involve two specific storage devices, in the set of stripes may be determined, and a correlation between the two specific storage devices can be set based on the determined number. Specifically, how to determine the correlation $\gamma_{Disk\ i, Disk\ j}$ between the ith storage device and the jth storage device will be described with reference to FIG. 6.

Figure 6:
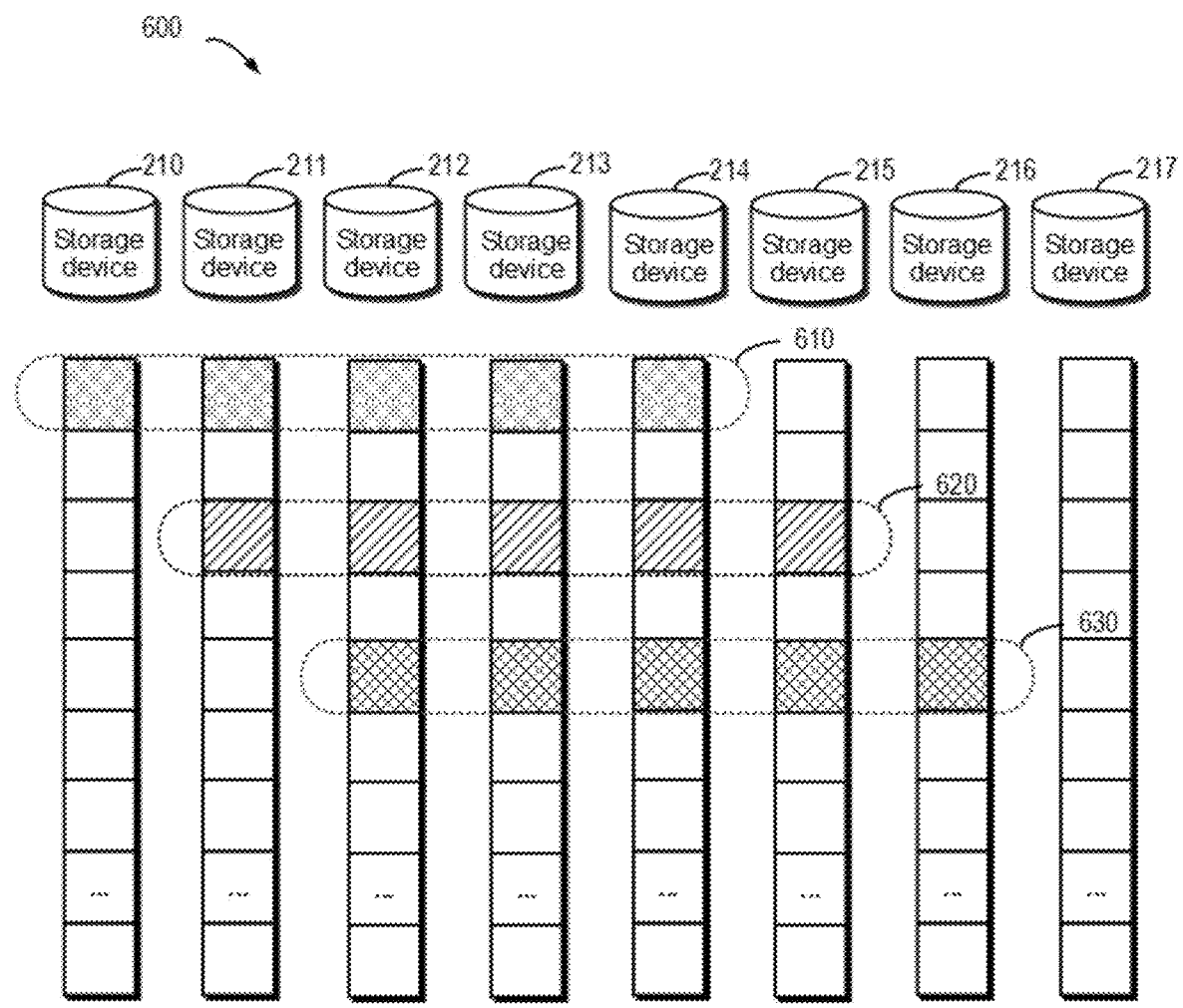
FIG. 6 schematically illustrates a block diagram of a process of determining a correlation between two storage devices according to an implementation of the present disclosure.

FIG. 6 schematically illustrates block diagram 600 of a process of determining a correlation between two storage devices according to an implementation of the present disclosure. As shown in FIG. 6, 3 stripes 610, 620, and 630 have been included in the storage system, and the correlation $\gamma_{Disk\ i, Disk\ j}$ may be determined based on the number of stripes that jointly involve the ith storage device and the jth storage device. If it is expected to determine a correlation between storage device 210 and storage device 211 (i.e., i=0, j=1), it may be found that only stripe 610 uses extents in storage device 210 and storage device 211 at the same time, and thus $\gamma_{Disk\ 0, Disk\ 1} = 1$.

For another example, if it is expected to determine a correlation between storage device 211 and storage device 212 (i.e., i=1, j=2), it may be found that stripe 610 uses extents in storage device 210 and storage device 211 at the same time, and stripe 620 also uses the extents in storage device 210 and storage device 211 at the same time, and thus $\gamma_{Disk\ 1, Disk\ 2} = 2$. Similarly, a correlation between any two storage devices in the multiple storage devices may be determined. It will be understood that a mapping relationship between the stripes and the extents in the stripes may be conveniently obtained from address mapping 330 of the storage system. Thus, with the example implementation of the present disclosure, a correlation between any two storage devices may be determined in a simple and effective manner.

According to an example implementation of the present disclosure, a device correlation of a specific storage device in the multiple storage devices may be determined based on a correlation between two storage devices. Specifically, a correlation between the specific storage device and each of the storage devices other than the specific storage device may be determined respectively. Furthermore, the device correlation of the specific storage device may be determined based on the determined correlations.

According to an example implementation of the present disclosure, the device correlation may be set to be positively proportional to the correlation between the storage device and each of the other storage devices. For example, a sum of multiple correlations may be acquired, and the device correlation may be determined based on the summation operation. With the example implementation of the present disclosure, the device correlation of the specific storage device may be determined based on the correlation between the specific storage device and another storage device on the basis of simple mathematical operations.

Assuming that it is expected to determine a device correlation of the ith storage device, a correlation between the ith storage device and another jth storage device ($0 \leq j \leq M-1$, and $i \neq j$) may be determined based on the method described above with reference to FIG. 6. According to an example implementation of the present disclosure, the device correlation $\gamma_{Disk\ i}$ of the ith storage device may be determined based on the following Formula 1:

$$\gamma_{Disk\ i} = \sum_{j=0}^{M-1} \gamma_{Disk\ i, Disk\ j} \qquad \text{Formula 1}$$

wherein $\gamma_{Disk\ i}$, indicates the device correlation of the ith storage device, $\gamma_{Disk\ i, Disk\ j}$ indicates the correlation between the ith storage device and the jth storage device, and M indicates the number of storage devices in the resource pool.

With the example implementation of the present disclosure, for the ith storage device, a device correlation $\gamma_{Disk\ i}$ of the device indicates a sum of correlations between the ith storage device and the other M−1 storage devices. In this case, the device correlation may accurately measure a degree of correlation between the ith storage device and the other storage devices, and the balance index of the storage device can be determined based on Formula 1. Selecting a storage device for creating a stripe based on the device correlation can accurately select, based on the workloads of the storage devices, a storage device that helps achieve load balance.

It will be understood that Formula 1 above only schematically shows a specific example for determining a device correlation. According to an example implementation of the present disclosure, other formulas may also be used to determine the device correlation. For example, the device correlation may be determined based on a product of multiple correlations.

According to an example implementation of the present disclosure, device correlations of the multiple storage devices may be respectively determined based on Formula 1 described above, and the balance index of the storage device may be determined based on the device correlation of the storage device and the device correlations of the multiple storage devices. For example, the balance index $C_{Disk\ i}$ of the ith storage device may be determined based on the following Formula 2:

$$C_{Disk\ i} = \frac{\gamma_{Disk\ i}}{\sum_{j=0}^{M-1} \gamma_{Disk\ j}} \qquad \text{Formula 2}$$

where $C_{Disk\ i}$ indicates the balance index of the ith storage device, $\gamma_{Disk\ i}$ indicates the device correlation of the ith storage device, and M indicates the number of storage devices in the resource pool. With the example implementation of the present disclosure, the numerator part $\gamma_{Disk\ i}$ may indicate the state distribution of a set of stripes involved by the ith storage device, and the denominator part $\sum_{j=0}^{M-1} \gamma_{Disk\ j}$ may indicate the state distribution of all stripes involved by all storage devices in the storage system, so a ratio of the two may accurately reflect the balance degree of the ith storage device.

The foregoing has described how to determine the device correlation $\gamma_{Disk\ i}$, of the ith storage device. It will be understood that each storage device may have different attributes. For example, multiple storage devices may have different sizes, one or some storage devices may include stripes for storing system data, and one or some storage devices may include stripes for storing user data. According to an example implementation of the present disclosure, an influence factor can be set for each storage device based on the above different attributes, so as to reflect the influence of the different attributes on the balance index.

According to an example implementation of the present disclosure, the attributes of the storage device may include the storage capacity of the storage device. Assuming that the storage system includes storage devices with two capacities of 400 GB and 800 GB, and storage resources in the mass storage device cannot be fully used without distinguishing the storage capacities. For example, it may happen that a 400 GB storage device is to be exhausted, but only about half of an 800 GB storage device is used. According to an example implementation of the present disclosure, the storage capacity of each storage device can be normalized in order to determine the influence factor.

According to an example implementation of the present disclosure, the storage capacities of other storage devices in the multiple storage devices can be determined. Here, the other storage devices may be, for example, a storage device with the maximum capacity, a storage device with the minimum capacity, or any storage device. The capacity of the storage device can be used as the basic unit for performing the normalization operation. For example, the maximum capacity of 800 GB can be used as the basic unit. Assuming that the storage capacities of storage devices 210 and 217 are 400 GB and 800 GB, respectively, then the influence factors of storage devices 210 and 217 can be set to 400/800=0.5 and 800/800=1.

The foregoing has described how to determine the balance index and influence factor of the ith storage device. Referring back to FIG. 5, at block 530, one storage device is selected from the multiple storage devices based on the determined balance indexes of block 510 and the determined influence factors of block 520 for creating the stripe. The balance index can be firstly updated using the influence factor. Continuing with the above example, the balance index can be set to be inversely proportional to the influence factor. Assuming that the balance indexes of storage devices 210 and 217 are both value X, then the balance index updated based on the influence factors can be expressed as 2X and X, respectively. This means that in the case where the storage devices have the same balance index, the smaller the capacity of a storage device, the more severe the balance index.

According to an example implementation of the present disclosure, if the minimum capacity of 400 GB is used as the basic unit, the influence factors of storage devices 210 and 217 can be set to 400/400=1 and 800/400=2. At this moment, assuming that the balance indexes of storage devices 210 and 217 are both value X, then the balance indexes updated based on the influence factors can be respectively expressed as X and 0.5X.

According to an example implementation of the present disclosure, a storage device with a low balance index may be selected from the multiple storage devices. Assuming that the balance index of the ith storage device among the multiple storage devices is less than that of the jth storage device among the multiple storage devices, then the ith storage device can be selected.

With the example implementation of the present disclosure, a storage device with the lowest balance index can be selected preferentially, so that the created stripe can make full use of the storage devices with better working states in the resource pool. According to an example implementation of the present disclosure, the balance indexes of all the storage devices can be compared, and one extent in a storage device with the minimum balance index can be selected as the first extent in the stripe. In this way, the stripe can be created by using extents in storage devices with the lowest balance index as much as possible.

Still referring to FIG. 5, at block 540, one extent in the selected storage device is added to the stripe. Assuming that the ith storage device has the minimum device correlation, then an idle extent can be selected from the ith storage device and added to the stripe. Continuing with the above example, assuming that the 0th storage device has a minimum balance index, an idle extent in the 0th storage device can be selected and added to the stripe. At this moment, the first extent in the stripe has been selected. With the example implementation of the present disclosure, by selecting one extent in a storage device with the minimum balance index to create a stripe, it can be ensured that the first extent in the stripe is located in a storage device currently with good performance, thereby helping to ensure the access performance of the entire stripe. In this way, it can be ensured that the first extent in the stripe is selected in a simple and effective way. Even if other technical solutions are subsequently used to select the remaining extents in the stripe, it can still be ensured that the first extent is located in a storage device with good performance and that a good access speed can be provided subsequently.

The foregoing has described the case where the attribute is the storage capacity. According to an example implementation of the present disclosure, the attributes of the storage device may include the type of data stored in the storage device. The type may include at least any one of a user data type and a system data type. Generally speaking, a storage device can store both data of the user data type and data of the system data type. Generally speaking, the access to data of the system type is performed frequently and requires a high access speed. At this moment, the influence of the data of the system data type should be taken into consideration.

According to the example implementation of the present disclosure, if it is determined that the storage device stores data of the system data type, the influence factor can be amplified. With the example implementation of the present disclosure, the influence of read and write operations of system data on the balance index of the storage device can be taken into consideration. On the other hand, by amplifying the influence factor, the updated balance index can be enabled to reflect the influence of the system data. When the other conditions of the multiple storage devices are the same, extents in the storage devices that do not include system data can be used preferentially to create stripes. In this way, interference with the read and write operations of system data can be reduced, and the performance of the created stripe can be ensured.

According to an example implementation of the present disclosure, the balance index $C_{Disk\ i}$ of the ith storage device may be determined based on the following Formula 3:

$$C_{Disk\ i} = \frac{\lambda_{\gamma, Disk\ i} \cdot \gamma_{Disk\ i}}{\sum_{j=0}^{M-1} \gamma_{Disk\ j}} \quad \text{Formula 3}$$

where $C_{Disk\ i}$ indicates the balance index of the ith storage device, $\gamma_{Disk\ i}$ indicates the device correlation of the ith storage device, and M indicates the number of storage devices in the resource pool. With the example implementation of the present disclosure, the numerator part $\lambda_{\gamma, Disk\ i}$ indicates the influence factor related to the correlation with respect to the ith storage device, $\gamma_{Disk\ i}$ may indicate the state distribution of a set of stripes involved by the ith storage device, and the denominator part $\Sigma_{j=0}^{M-1} \gamma_{Disk\ j}$ may indicate the state distribution of all stripes involved by all storage devices in the storage system, so a ratio of the two may accurately reflect the balance degree of the ith storage device.

According to an example implementation of the present disclosure, the influence factor is amplified based on a ratio between the storage space of the storage device and a portion of the storage device that can be used to store user data. Assuming that storage device 214 has a capacity of 400 GB, of which 240 GB is used to store system data, and 160 GB is used to store user data. At this moment, an amplification coefficient can be set based on 400/160=2.5, in other words, the influence factor will be amplified to 2.5 times. Specifically, assuming that the balance index of storage device 214 is X, and the influence factor is 400/400=1. The influence factor will be updated to 1×2.5, and the updated balance index will be 2.5X. Except that storage device 214 includes system data, the other configurations of storage devices 210 and 214 are the same. Compared with the balance index X of storage device 210 storing user data, since X is less than 2.5X, it is easier at this moment to select an extent in storage device 210 to create a new stripe.

It will be understood that only an example for setting the amplification coefficient is shown above. According to an example implementation of the present disclosure, the amplification coefficient may be set based on other methods. For example, the amplification coefficient can be set based on a ratio of the size of the system data portion to that of the user data portion in the storage device. For another example, the access frequencies of the user data portion and the system data portion in the storage device can be counted, and the amplification coefficient can be set based on the access frequencies. Assuming that the access frequency of the system data is twice that of the user data, then the amplification coefficient can be set to 2.

It will be understood that the above balance index only indicates the influence of stripe distribution on the storage performance of a storage device. According to an example implementation of the present disclosure, there may also be other factors that affect the balance index. For example, when an access load of a storage device is high, the performance of the storage device will decrease. For another example, when a wear degree of a storage device is high, the reliability of the storage device will decrease.

According to an example implementation of the present disclosure, the balance index may be updated based on the access load of the storage device. Specifically, the access load of the storage device may be determined, and access loads of the multiple storage devices may be determined respectively. The access load may have various representations. For example, at least one of the following may be used to represent the access load: the number of accesses per unit time, the volume of data accesses per unit time, the total number of accesses, the total volume of data accesses, and so on. Then, the balance index of the storage device may be updated based on the access load of the storage device and the access loads of the multiple storage devices. According to an example implementation of the present disclosure, the balance index $C_{Disk\ i}$ of the ith storage device may be determined based on the following Formula 4:

$$C_{Disk\ i} = \omega_\gamma \cdot \frac{\lambda_{\gamma,Disk\ i} \cdot \gamma_{Disk\ i}}{\sum_{j=0}^{M-1} \gamma_{Disk\ j}} + \omega_T \cdot \frac{\lambda_{T,Disk\ i} \cdot T_{Disk\ i}}{\sum_{j=0}^{M-1} T_{Disk\ j}} \quad \text{Formula 4}$$

where $C_{Disk\ i}$ indicates the balance index of the ith storage device, $\gamma_{Disk\ i}$ indicates the device correlation of the ith storage device, $\lambda_{\gamma,Disk\ i}$ indicates the influence factor related to the correlation with respect to the ith storage device, $\gamma_{Disk,j}$ indicates the device correlation of the jth storage device, M indicates the number of storage devices in the resource pool, $\lambda_{T,Disk\ i}$ indicates the influence factor related to the access load with respect to the ith storage device, $T_{Disk\ i}$ indicates the access load of the ith storage device, $\Sigma_{j=0}^{M-1} T_{Disk\ j}$ indicates the sum of the access loads of all the M storage devices, and $\omega_\gamma$ and $\omega_T$ respectively indicate the weights related to the correlation and the access load. It will be understood that Formula 4 above is only a schematic way to determine the balance index. According to an example implementation of the present disclosure, the balance index may be determined based on other formulas. For example, the balance index may be determined based on a product of the device correlation and the access load.

According to an example implementation of the present disclosure, the balance index may be updated based on the wear degree of the storage device. It will be understood that the wear degree is an index indicating the service life of a storage device, and a high wear degree means that the remaining usage time of the storage device is reduced. When the wear degree reaches a certain threshold, it means that the life of the storage device is about to end, and the storage device needs to be replaced in time.

Specifically, the wear degree of the storage device may be determined, and wear degrees of the multiple storage devices may be determined respectively. The wear degree may have various representations. For example, at least one of the following may be used to indicate the wear degree: the number of write operations that have been performed, a ratio of the number of write operations that have been performed to a predetermined threshold, and so on. Then, the balance index of the storage device may be updated based on the wear degree of the storage device and the wear degrees of the multiple storage devices. According to an example implementation of the present disclosure, the balance index $C_{Disk\ i}$ of the ith storage device may be determined based on the following Formula 5:

$$C_{Disk\ i} = \omega_\gamma \cdot \frac{\lambda_{\gamma,Disk\ i} \cdot \gamma_{Disk\ i}}{\sum_{j=0}^{M-1} \gamma_{Disk\ j}} + \omega_W \cdot \frac{\lambda_{W,Disk\ i} \cdot W_{Disk\ i}}{\sum_{j=0}^{M-1} W_{Disk\ j}} \quad \text{Formula 5}$$

where $C_{Disk\ i}$ indicates the balance index of the ith storage device, $\gamma_{Disk\ i}$ indicates the device correlation of the ith storage device, $\lambda_{\gamma,Disk\ i}$ indicates the influence factor related to the correlation with respect to the ith storage device, $\gamma_{Disk\ j}$ indicates the device correlation of the jth storage device, M indicates the number of storage devices in the resource pool, $\lambda_{W,Disk\ i}$ indicates the influence factor related to the wear degree with respect to the ith storage device, $W_{Disk\ i}$ indicates the wear degree of the ith storage device, $\Sigma_{j=0}^{M-1} W_{Disk}$ indicates the sum of the wear degrees of all the M storage devices, and $\omega_\gamma$ and $\omega_W$ respectively indicate the weights related to the correlation and the wear degree.

It will be understood that Formula 5 above is only a schematic way to determine the balance index. According to an example implementation of the present disclosure, the balance index may be determined based on other formulas. For example, the balance index may be determined based on a product of the device correlation and the wear degree.

According to an example implementation of the present disclosure, the balance index $C_{Disk\ i}$ of the ith storage device may be determined based on the following Formula 6:

$$C_{Disk\ i} = \omega_\gamma \cdot \frac{\lambda_{\gamma,Disk\ i} \cdot \gamma_{Disk\ i}}{\sum_{j=0}^{M-1} \gamma_{Disk\ j}} + \omega_T \cdot \frac{\lambda_{T,Disk\ i} \cdot T_{Disk\ i}}{\sum_{j=0}^{M-1} T_{Disk\ j}} + \omega_W \cdot \frac{\lambda_{W,Disk\ i} \cdot W_{Disk\ i}}{\sum_{j=0}^{M-1} W_{Disk\ j}} \quad \text{Formula 6}$$

where $C_{Disk\ i}$ indicates the balance index of the ith storage device, $\gamma_{Disk\ i}$ indicates the device correlation of the ith storage device, $\gamma_{Disk\ j}$ indicates the device correlation of the jth storage device, M indicates the number of storage devices in the resource pool, $T_{Disk\ i}$ indicates the access load of the ith storage device, $\Sigma_{j=0}^{M-1} T_{Disk\ j}$ indicates the sum of the access loads of all the M storage devices, $W_{Disk\ i}$ indicates the wear degree of the ith storage device, $\Sigma_{j=0}^{M-1} W_{Disk\ j}$ indicates the sum of the wear degrees of all the M storage devices, $\omega_\gamma$, $\omega_T$, and $\omega_W$ respectively indicate the weights related to the correlation, the access load, and the wear degree, and $\lambda_{\gamma,Disk\ i}$, $\lambda_{T,Disk\ i}$, and $\lambda_{W,Disk\ i}$ respectively indicate the influence factors related to the correlation, the access load, and the wear degree with respect to the ith storage device.

It will be understood that Formula 6 above is only a schematic way to determine the balance index. According to an example implementation of the present disclosure, the balance index may be determined based on other formulas. For example, the balance index may be determined based on a product of the correlation, the access load, and the wear degree. According to an example implementation of the present disclosure, value ranges of $\omega_\gamma$, $\omega_T$, and $\omega_W$ may be set. For example, $\omega_\gamma + \omega_T + \omega_W = 1$ can be defined. According to an example implementation of the present disclosure, a value range may be specified for each weight. For example, the value range of each weight may be determined based on the following Table 1.

TABLE 1

Value ranges of weights

| Weight | Value range |
|---|---|
| $\omega_\gamma$ | 0.6-1 |
| $\omega_T$ | 0-0.3 |
| $\omega_W$ | 0-0.1 |

It will be understood that Table 1 above only schematically illustrates a specific example of the value ranges. Generally speaking, the correlation has a great influence on the performance of a storage device, so $\omega_\gamma$ may be set as a high weight. According to an example implementation of the present disclosure, assuming that multiple storage devices in the storage system already have high wear degrees, then weight $\omega_W$ of the wear degree may be set as a high value.

The foregoing has described how to select the first extent in the stripe. Hereinafter, how to select other extents in the stripe will be described. According to an example implementation of the present disclosure, the concept of a balance index of a storage device with respect to a stripe is proposed. The aforementioned balance index may be referred to as a stripe balance index of the storage device for short. The stripe balance index may be determined based on one or more of the correlation, the access load, and the wear degree described above. First, it will be described as to determining the stripe balance index based on the correlation of the device with respect to the stripe (referred to as the stripe correlation for short).

The stripe correlation describes a correlation between one storage device and multiple storage devices where one stripe is located. The higher the stripe correlation, the closer the relationship between the storage device and the stripe. For example, a stripe correlation $\gamma_{Disk\ i,RE\ k}$ between the ith storage device and the kth stripe may be determined based on the following Formula 7:

$$\gamma_{Disk\ i,REk} = \sum_{Disk\ j \in REk} \gamma_{Disk\ i, Disk\ j} \qquad \text{Formula 7}$$

where $\gamma_{Disk\ i,RE\ k}$ indicates the stripe correlation between the ith storage device and the kth stripe, $\gamma_{Disk\ i,Disk\ j}$ indicates the correlation between the ith storage device and the jth storage device, M indicates the number of storage devices in the resource pool, and the jth storage device indicates various storage devices including extents in the kth stripe.

According to an example implementation of the present disclosure, the stripe correlation can be used as a stripe balance index to select an extent in the next storage device for creating the stripe. With the example implementation of the present disclosure, the correlations between a storage device and storage devices where each of the extents in the stripe is located can reflect degrees of closeness between the storage device and all storage devices involved in the stripe. A degree of closeness between a device and a stripe can be determined in a simple and effective way by summing multiple correlations.

It will be understood that since multiple extents in the stripe need to be located in different storage devices, the stripe needs to be created by selecting extents from other storage devices not involved in the stripe. At this moment, a set of storage devices involved in the stripe and a set of storage devices not involved in the stripe can be determined. In an initial stage of creation of the stripe, the stripe includes only an extent in one storage device. The subsequent second, third, fourth, and fifth extents may be determined step by step.

Specifically, in the multiple storage devices, a first set of storage devices that do not include any extent in the stripe may be determined, and a second set of storage devices that include extents in the stripe may be determined. For a given storage device in the first set of storage devices, a device correlation between the given storage device and each storage device in the second set of storage devices may be determined respectively, and then a stripe correlation between the given storage device and the stripe may be determined.

Continuing with the above example, the stripe includes only an extent in the 0th storage device at the beginning, and at this moment, 4 other storage devices can be selected from the 1st to 7th storage devices. A stripe correlation between the ith storage device ($1 \leq i \leq 7$) and the stripe (including only the extent in the 0th storage device) may be determined respectively based on Formula 6 described above.

A storage device in the first set of storage devices may be selected based on the determined stripe correlation. According to an example implementation of the present disclosure, it is expected that an overall correlation between various storage devices where the extents in the created stripe are located is as small as possible, and thus an extent in a storage device with a small stripe correlation can be preferentially selected. Furthermore, one idle extent in the selected storage device may be added to the stripe. With the example implementation of the present disclosure, each time the next extent in the stripe is selected, an extent in a storage device with a small correlation can be selected in a simple and effective way by using the stripe correlation.

Specifically, a storage device with a low stripe correlation may be selected from the multiple storage devices. Assuming that a first stripe correlation of a first storage device in the multiple storage devices is lower than a second stripe correlation of a second storage device in the multiple storage devices, then the first storage device can be selected. With the example implementation of the present disclosure, a storage device having a low correlation with a device where an extent in the current stripe is located can be selected based on the stripe correlation, so that various storage devices where various extents in the created stripe are located have low degrees of closeness.

According to an example implementation of the present disclosure, the stripe correlations of the storage devices may be compared, and an extent in a storage device with a minimum stripe correlation can be selected as a subsequent extent in the stripe. In this way, storage devices that are more distantly related to one or more storage devices involved in the current stripe can be used as much as possible, so that the stripe can run with high performance.

For convenience of description, a symbol $\gamma_{Disk\ i,RE\ current}$ may be used to represent the stripe correlation between the ith storage device and the current stripe, where RE current indicates a storage device where an extent in the current stripe is located. In order to determine a second extent in the stripe, a storage device with a minimum stripe correlation can be selected. Assuming that the 1st storage device has a minimum stripe correlation with the stripe, an idle extent in the 1st storage device can be selected and added to the stripe.

At this moment, the stripe may include two extents: an extent located in the 0th storage device and an extent located in the 1st storage device.

It will be understood that since the number of extents in a stripe is determined by the width N of the stripe, the above steps can be repeated while the number of extents in the stripe is lower than N. According to an example implementation of the present disclosure, the width of the stripe may be determined first, and it is determined, based on comparison between the number of extents in the current stripe and the width, whether a selection step is to be performed. Specifically, if the number of extents is lower than the width of the stripe, the next extent is selected; otherwise, the selection operation is stopped. In order to select one or more subsequent extents, a stripe correlation between each storage device that can be selected and the current stripe can be determined continuously based on the above Formula 7, and then an idle extent in a storage device with a minimum stripe correlation can be selected.

With the example implementation of the present disclosure, each extent in the stripe can be determined one by one only through simple mathematical calculations. In this way, it can be ensured that a stripe is created by selecting an extent in a storage device most conducive to achieving load balancing from multiple storage devices each time.

The foregoing has described determining the stripe balance index of the storage device based on the stripe correlation and then selecting one or more subsequent extents. According to an example implementation of the present disclosure, a combined correlation can also be determined based on both the stripe correlation and the device correlation of the storage device, and then the stripe balance index can be set to the combined correlation. It will be understood that multiple extents in the stripe will be accessed in association, and by selecting a storage device based on the stripe correlation, mutual influence between various storage devices in the created stripe can be taken into consideration. During subsequent operations, the performance of the storage device will also be affected by the correlation between the storage device and other storage devices (that is, the device correlation). Therefore, the storage device can be selected based on both the stripe correlation and the device correlation. With the example implementation of the present disclosure, the above two factors can be fully considered to improve the overall performance of the storage system.

According to an example implementation of the present disclosure, the combined correlation $\gamma_{Disk\ i,RE\ current}$ between the ith storage device and the current stripe may be determined based on Formula 8:

$$\gamma_{Disk\ i,RE\ current} = \gamma_{Disk\ i,RE\ current} + \gamma_{Disk\ i} \quad \text{Formula 8}$$

where $\gamma_{Disk\ i,RE\ current}$ indicates the combined correlation between the ith storage device and the current stripe, $\gamma_{Disk\ i,RE\ current}$ indicates the stripe correlation between the ith storage device and the current stripe, and $\gamma_{Disk\ i}$ indicates the device correlation of the ith storage device. It will be understood that Formula 8 is merely a specific example for calculating the combined correlation, and according to an example implementation of the present disclosure, other formulas may be used to determine the combined correlation. For example, the combined correlation may be determined based on a product of the stripe correlation and the device correlation.

The foregoing has described determining the stripe balance index of each storage device based on the combined correlation. A score for each storage device that can be used to create the stripe can be determined. For example, the score $C_{Disk\ u,RE\ current}$ of the uth storage device may be determined based on Formula 9 below, wherein this score indicates the score of the balance index of selecting one extent from the uth storage device for use to be added into the current stripe. A storage device with a low score may be preferentially selected.

$$C_{Disk\ u,RE\ current} = \frac{\lambda_{\gamma,Disk\ i} \cdot (\gamma_{Disk\ u} + \gamma_{Disk\ u,RE\ current})}{\sum_{Disk\ v \notin REk} \lambda_{\gamma,Disk\ i} \cdot (\gamma_{Disk\ v} + \gamma_{Disk\ v,RE\ current})} \quad \text{Formula 9}$$

In Formula 9, $C_{Disk\ u,RE\ x}$ indicates the score of the uth storage device, $\gamma_{Disk\ u}$ indicates the device correlation of the uth storage device $\gamma_{Disk\ u,RE\ current}$ indicates the stripe correlation between the uth storage device and the current stripe, Disk v indicates the vth storage device, which does not belong to the current stripe, in the storage system $\gamma_{Disk\ v,RE\ current}$ indicates the stripe correlation between the vth storage device and the current stripe, and $\lambda_{\gamma,Disk\ i}$ indicates the influence factor related to the correlation with respect to the ith storage device.

Furthermore, the score of the given storage device may be determined based on at least any one of the access load of the given storage device and the wear degree of the given storage device, as well as the stripe correlation.

According to an example implementation of the present disclosure, the score $C_{Disk\ u,RE\ current}$ of the uth storage device may be determined based on Formula 10:

$$C_{Disk\ u,REk\ current} = \omega_\gamma \cdot \frac{\lambda_{\gamma,Disk\ i} \cdot (\gamma_{Disk\ u} + \gamma_{Disk\ u,RE\ current})}{\sum_{Disk\ v \notin RE\ current} \lambda_{\gamma,Disk\ i} \cdot (\gamma_{Disk\ v} + \gamma_{Disk\ v,RE\ current})} + \omega_T \cdot \frac{\lambda_{T,Disk\ i} \cdot T_{Disk\ u}}{\sum_{Disk\ v \notin RE\ current} \lambda_{T,Disk\ i} \cdot T_{Disk\ v}} \quad \text{Formula 10}$$

where the meanings of the symbols are the same as those in Formula 9, in which $T_{Disk\ u}$ indicates the access load of the uth storage device, $T_{Disk\ v}$ indicates the access load of the vth storage device, $\omega_\gamma$ and $\omega_T$ respectively indicate the weights related to the correlation and the access load, and $\lambda_{\gamma,Disk\ i}$ and $\lambda_{T,Disk\ i}$ respectively indicate the influence factors related to the correlation and the access load with respect to the ith storage device.

According to an example implementation of the present disclosure, the score $C_{Disk\ u,RE\ current}$ of the uth storage device may be determined based on Formula 11:

$$C_{Disk\ u,REk} = \omega_\gamma \cdot \frac{\lambda_{\gamma,Disk\ i} \cdot (\gamma_{Disk\ u} + \gamma_{Disk\ u,RE\ current})}{\sum_{Disk\ v \notin RE\ current} \lambda_{\gamma,Disk\ i} \cdot (\gamma_{Disk\ v} + \gamma_{Disk\ v,RE\ current})} + \omega_W \cdot \frac{\lambda_{W,Disk\ i} \cdot W_{Disk\ u}}{\sum_{Disk\ v \notin RE\ current} \lambda_{\gamma,Disk\ i} \cdot W_{Disk\ v}} \quad \text{Formula 11}$$

where the meanings of the symbols are the same as those in Formula 10, in which $W_{Disk\ u}$ indicates the wear degree of the uth storage device, $W_{Disk\ v}$ indicates the wear degree of the vth storage device, $\omega_\gamma$ and $\omega_W$ respectively indicate the weights related to the correlation and the wear degree, and $\lambda_{\gamma,Disk\ i}$ and $\lambda_{W,Disk\ i}$ respectively indicate the influence factors related to the correlation and the wear degree with respect to the ith storage device.

According to an example implementation of the present disclosure, the score $C_{Disk\ u,RE\ current}$ of the uth storage device may be determined based on Formula 12:

$$C_{Disk\,u,RE\,current} = \omega_\gamma \cdot \frac{\lambda_{\gamma,Disk\,i} \cdot (\gamma_{Disk\,u} + \gamma_{Disk\,u,RE\,current})}{\sum_{Disk\,v \notin RE\,current} \lambda_{\gamma,Disk\,i} \cdot (\gamma_{Disk\,v} + \gamma_{Disk\,v,RE\,current})} + \quad \text{Formula 12}$$

$$\omega_T \cdot \frac{\lambda_{\gamma,Disk\,i} \cdot T_{Disk\,u}}{\sum_{Disk\,v \notin RE\,current} \lambda_{T,Disk\,i} \cdot T_{Disk\,v}} +$$

$$\omega_W \cdot \frac{\lambda_{W,Disk\,i} \cdot W_{Disk\,u}}{\sum_{Disk\,v \notin RE\,current} \lambda_{W,Disk\,i} \cdot W_{Disk\,v}}$$

where the meanings of the symbols are the same as those in the formulas shown above, and $\omega_\gamma$, $\omega_T$ and $\omega_W$ respectively indicate the weights related to the correlation, the access load, and the wear degree, and $\lambda_{\gamma,Disk\ i}$, $\lambda_{T,Disk\ i}$, and $\lambda_{W,Disk\ i}$ respectively indicate the influence factors related to the correlation, the access load and the wear degree with respect to the ith storage device.

It will be understood that Formulas 7 to 12 shown above only schematically illustrate examples of formulas for determining the score of the stripe balance index. According to an example implementation of the present disclosure, the score may be determined based on other formulas. For example, the influence may be determined based on a product of the combined correlation, the access load, and the wear degree. With the example implementation of the present disclosure, a destination storage device may be selected in a convenient and effective manner.

According to an example implementation of the present disclosure, the storage device with a low score may be selected. Alternatively and/or additionally, a storage device with the lowest score may be selected. With the example implementation of the present disclosure, a storage device with the lowest balance index can be selected preferentially based on the score, so that the created stripe can make full use of the storage devices with good working states in the resource pool.

The foregoing has described how to select the first extent and the other extents in the stripe. Hereinafter, how to determine the 1st to 5th extents in the stripe will be described step by step with reference to FIGS. 7A to 7E. In the above storage system, assuming that the 0th to 7th storage devices have a capacity of 400 GB, which is used to store user data; the 4th to 5th storage devices have a capacity of 400 GB, which is used to store system data (occupying 60% of the capacity) and user data (occupying 40% of the capacity); and the 6th to 7th storage devices have a capacity of 800 GB, which is used to store user data. Assuming that there are already multiple stripes, and matrix M below shows correlations between various storage devices of the 8 storage devices. For example, an intersection between the ith row and the jth column shows the correlation between the ith storage device and the jth storage device.

$$M = \begin{bmatrix} 0 & 3 & 0 & 3 & 1 & 2 & 3 & 0 \\ 3 & 0 & 1 & 4 & 1 & 2 & 3 & 1 \\ 0 & 1 & 0 & 1 & 0 & 0 & 1 & 1 \\ 3 & 4 & 1 & 0 & 1 & 2 & 3 & 1 \\ 1 & 1 & 0 & 1 & 0 & 0 & 1 & 0 \\ 2 & 2 & 0 & 2 & 0 & 0 & 2 & 0 \\ 3 & 3 & 1 & 3 & 1 & 2 & 0 & 1 \\ 0 & 1 & 1 & 1 & 0 & 0 & 1 & 0 \end{bmatrix}$$

Based on the method described above, it can be determined that the influence factors for the above 8 storage devices are [1 1 1 1 2.5 2.5 0.5 0.5]. Assuming that the influence factors $\lambda_{T,Disk\ i}$ and $\lambda_{W,Disk\ i}$ related to the access load and the wear degree with respect to the ith storage device are respectively 1.2 and 1.1, the weights $\omega_\gamma$, $\omega_T$, and $\omega_W$ related to the correlation, the access load, and the wear degree are respectively 0.7, 0.2, and 0.1, and it is expected to create 4 new stripes in the storage system.

Assuming that the initial access load of each storage device is represented as matrix A, the average access load of each extent in the new 4 stripes is represented as matrix B, the current cumulative write request of each storage device is represented as matrix C, and the average write request of each stripe is represented as matrix D.

$$A = [21 \ 24 \ 8 \ 24 \ 5 \ 10 \ 12 \ 9]$$

$$B = \begin{bmatrix} 11 & 8 & 8 & 11 & 9 \\ 7 & 3 & 7 & 9 & 8 \\ 6 & 1 & 7 & 4 & 2 \\ 10 & 12 & 4 & 6 & 5 \end{bmatrix}$$

$$C = [120 \ 150 \ 80 \ 120 \ 100 \ 80 \ 160 \ 70]$$

$$D = \begin{bmatrix} 11 & 3 & 2 & 5 & 7 \\ 6 & 1 & 5 & 8 & 8 \\ 5 & 0 & 2 & 4 & 2 \\ 7 & 10 & 4 & 5 & 3 \end{bmatrix}$$

Figure 7A:
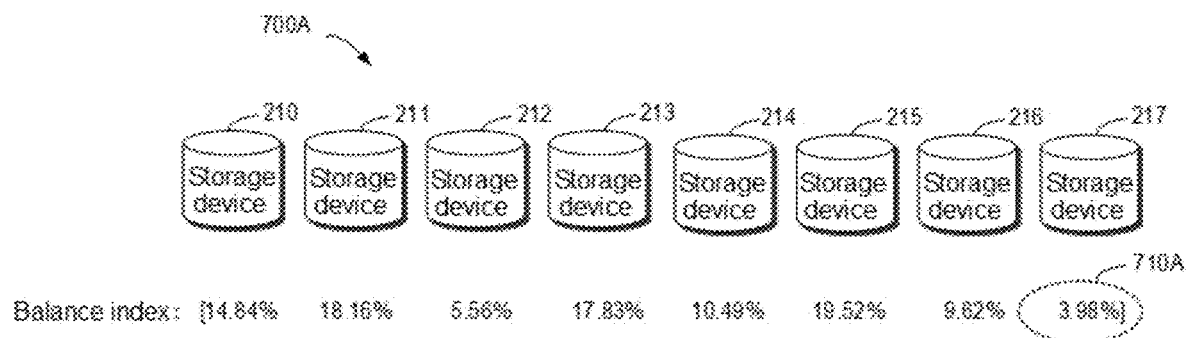
FIG. 7A schematically illustrates a block diagram of a process for selecting a first extent for creating a stripe according to an implementation of the present disclosure.

The first extent in the first stripe is determined first, and the balance index of each of the 8 storage devices can be determined. FIG. 7A schematically illustrates block diagram 700A of a process for selecting a first extent for creating a stripe according to an implementation of the present disclosure. As shown in FIG. 7A, the balance indexes of the 0th to 7th storage devices may be represented as a matrix:

[14.84% 18.16% 5.56% 17.83% 10.49% 19.52% 9.62% 3.98%].

As shown in ellipse 710A, the 7th storage device (i.e., storage device 217) has a minimum score, and thus an idle extent in the 7th storage device can be selected and added to the stripe.

Figure 7B:
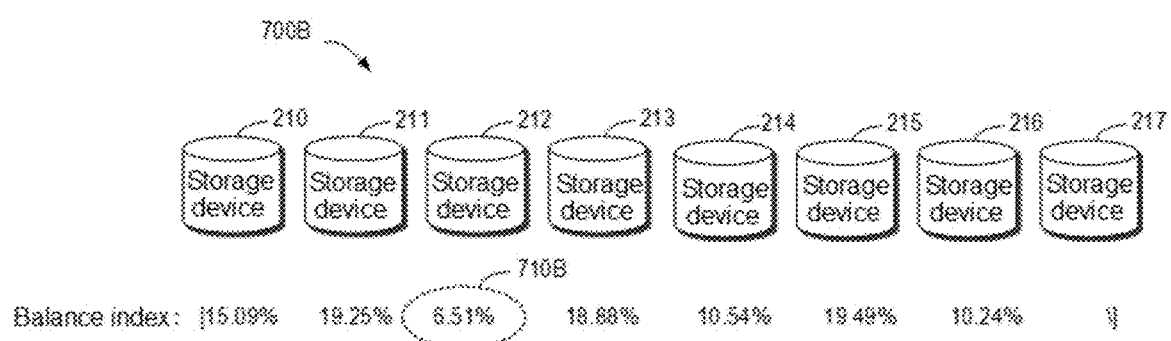
FIGS. 7B to 7E each schematically illustrate a block diagram of a process for selecting other extents for creating the stripe according to an implementation of the present disclosure.

FIG. 7B schematically illustrates block diagram 700B of a process for selecting a second extent for creating the stripe according to an implementation of the present disclosure. At this moment, the stripe includes the extent in the 7th storage device, and based on the working principle of RAID, the 7th storage device will be excluded during the selection of subsequent extents. The score of each device may be determined based on Formula 12:

[15.09% 19.25% 6.51% 18.88% 10.54% 19.49% 10.24% \].

Since the 7th storage device has been excluded, the score of the 7th storage device does not need to be calculated at this moment, and the score of the 7th storage device can be represented with "\." As shown in ellipse 710B, the 2nd storage device (i.e., storage device 212) has a minimum score, and thus an idle extent in the 2nd storage device can be selected and added to the stripe.

Figure 7C:
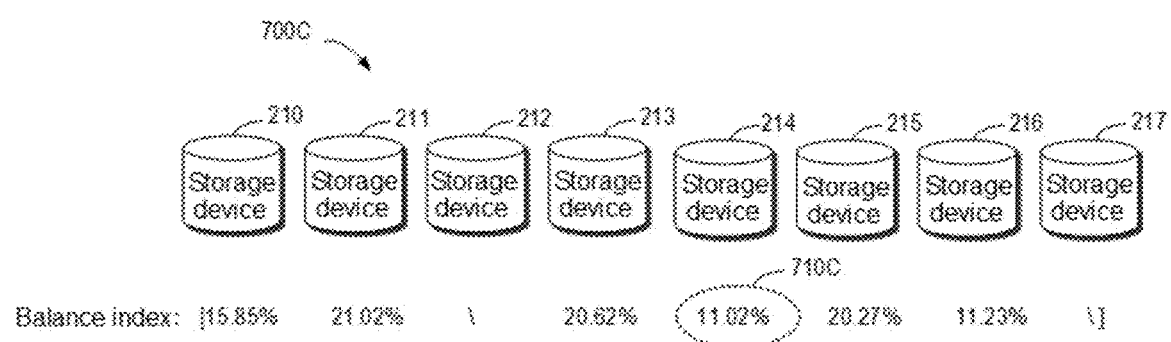

FIG. 7C schematically illustrates block diagram 700C of a process for selecting a third extent for creating the stripe according to an implementation of the present disclosure. At this moment, the stripe includes the extents in the 7th and 2nd storage devices, and thus the 7th and 2nd storage devices will be excluded during the selection of subsequent extents. The score of each device may be determined based on Formula 12:

[15.85% 21.02% \ 20.62% 11.02% 20.27% 11.23% \].

Since the 7th and 2nd storage devices have been excluded, the combined correlations of the 7th and 2nd storage devices do not need to be calculated at this moment. As shown in ellipse 710C, the 4th storage device (i.e., storage device 214) has a minimum score, and thus an idle extent in the 4th storage device can be selected and added to the stripe.

Figure 7D:
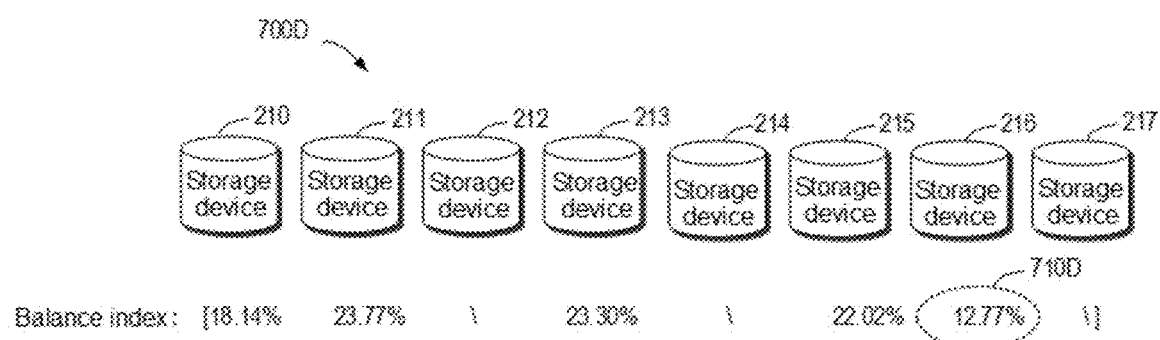

FIG. 7D schematically illustrates block diagram 700D of a process for selecting a fourth extent for creating the stripe according to an implementation of the present disclosure. The score of each device can be determined based on Formula 12. The score can be represented by the following matrix:

[18.14% 23.77% \ 23.30% \ 22.02% 12.77% \].

As shown in ellipse 710D, the 6th storage device (i.e., storage device 216) has a minimum score, and thus an idle extent in the 6th storage device can be selected and added to the stripe.

Figure 7E:
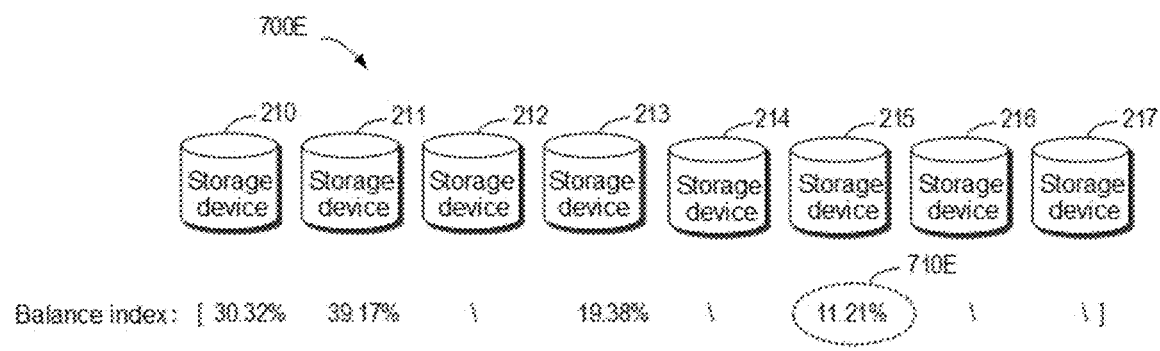

FIG. 7E schematically illustrates block diagram 700E of a process for selecting a fifth extent for creating the stripe according to an implementation of the present disclosure. The score of each device may be determined based on Formula 12:

[30.32% 39.17% \ 19.38% \ 11.12% \ \].

As shown in ellipse 710E, the 5th storage device (i.e., storage device 215) has a minimum score, and thus an idle extent in the 5th storage device can be selected and added to the stripe.

Figure 8:
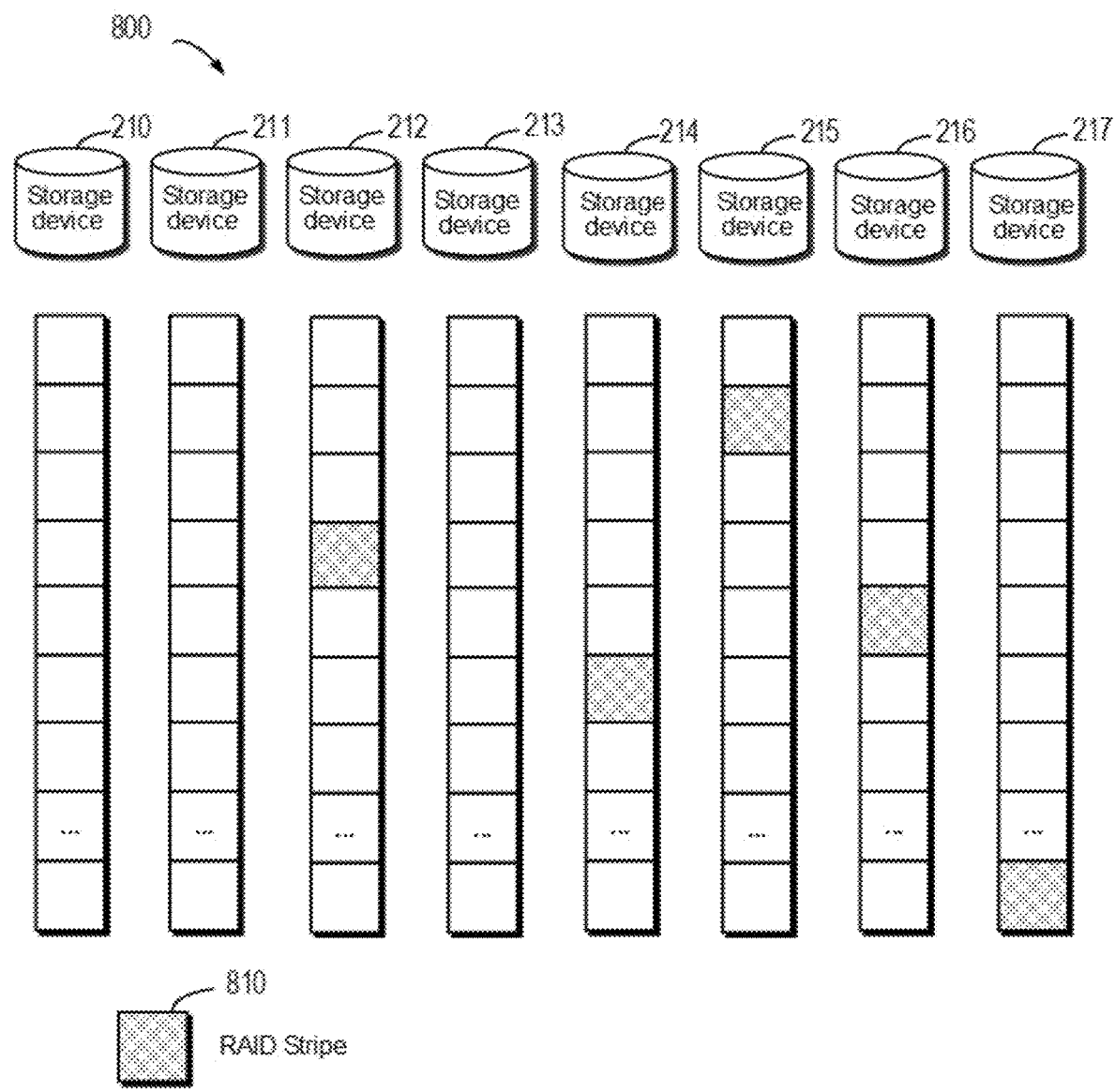
FIG. 8 schematically illustrates a block diagram of a stripe created according to an implementation of the present disclosure.

The 5 extents in the stripe can be determined step by step using the method described with reference to FIGS. 7A to 7E. FIG. 8 schematically illustrates block diagram 800 of a stripe created according to an implementation of the present disclosure. Reference number 810 indicates the first newly created RAID stripe, and at this moment, the selected extents are located in the 2nd, 4th, 5th, 6th, and 7th storage devices, respectively. After the RAID stripe has been created, correlations between various storage devices in the storage system may be updated as the following matrix M'.

$$M' = \begin{bmatrix} 0 & 3 & 1 & 3 & 2 & 2 & 4 & 1 \\ 3 & 0 & 1 & 4 & 1 & 2 & 3 & 1 \\ 1 & 1 & 0 & 1 & 1 & 0 & 2 & 2 \\ 3 & 4 & 1 & 0 & 1 & 2 & 3 & 1 \\ 2 & 1 & 1 & 1 & 0 & 0 & 2 & 1 \\ 2 & 2 & 0 & 2 & 0 & 0 & 2 & 0 \\ 4 & 3 & 2 & 3 & 2 & 2 & 0 & 2 \\ 1 & 1 & 2 & 1 & 1 & 0 & 2 & 0 \end{bmatrix}$$

With the example implementation of the present disclosure, it can be ensured that extents in a newly created stripe can be evenly distributed in multiple storage devices and that the balance indexes and the performance of the multiple storage devices are balanced as much as possible.

Then, a 2nd stripe can be created in the storage system. Based on the method described above, one extent in the 7th storage device can be selected as the first extent in the stripe, and one extent in each of the 2nd, 6th, 3rd, and 5th storage devices can be selected as the subsequent 4 extents.

A 3rd stripe can be created in the storage system. Based on the method described above, an extent in each of the 7th, 2nd, 6th, 1st, and 0th storage devices can be selected to create the stripe.

A 4th stripe can be created in the storage system. Based on the method described above, an extent in each of the 7th, 2nd, 6th, 4th, and 1st storage devices can be selected to create the stripe.

The distribution of the correlations of the various storage devices after the 4 stripes are created according to method 500 may be determined based on a probability distribution method. The correlation of the storage system may be, for example, determined based on a sum of correlations among all the storage devices in the storage system. According to an example implementation of the present disclosure, the correlation $\gamma_{StorageSystem}$ of the storage system may be determined based on the following Formula 13:

$$\gamma_{StorageSystem} = \sum_{i=0}^{M-1} \lambda_{\gamma, Disk\, i} \cdot \gamma_{Disk\, i} \qquad \text{Formula 13}$$

where $\gamma_{StorageSystem}$ indicates the correlation of the storage system, $\gamma_{Disk\, i}$ indicates the device correlation of the ith storage device $\gamma_{Disk\, i, Disk\, j}$ indicates the correlation between the ith storage device and the jth storage device, M indicates the number of storage devices in the storage system, and $\lambda_{\gamma, Disk\, i}$ indicates the influence factor related to the correlation with respect to the ith storage device. Specifically, the balance index of the storage system may be determined based on the correlation of the storage system.

According to an example implementation of the present disclosure, the average device correlation $\gamma_{Disk\, average}$ of all the storage devices in the storage system may be determined based on the following Formula 14. The meanings of the symbols in Formula 14 are the same as those in the above formulas.

$$\gamma_{Disk\, average} = \frac{1}{M} \gamma_{StorageSystem} \qquad \text{Formula 14}$$

According to an example implementation of the present disclosure, a standard deviation σ of a device correlation of each storage device in the storage system may be determined based on the following Formula 15. The meanings of the symbols in Formula 15 are the same as those in the above formulas.

$$\sigma = \sqrt{\frac{\sum_{i=0}^{M-1} (\lambda_{\gamma, Disk\, i} \cdot \gamma_{Disk\, i} - \gamma_{Disk\, average})^2}{M-1}} \qquad \text{Formula 15}$$

According to an example implementation of the present disclosure, the balance index of the storage system may be determined based on the following Formula 16.

$$\lambda = \frac{\sigma}{\gamma_{Disk\, average}} \qquad \text{Formula 16}$$

The foregoing has described determining the balance index of the storage system based on the correlation of the storage system. It will be understood that when the balance index of the storage system is determined, the access load and the wear degree of the storage system may also be considered. Similarly, balance indexes related to the access load and the wear degree of the relevant storage device may be determined (as shown in Formulas 17 and 18):

$$\mu = \frac{\sqrt{\sum_{i=0}^{M-1}(\lambda_{T,Disk\ i} \cdot T_{Disk\ i} - T_{Disk\ average})^2}{M-1}}}{T_{Disk\ average}} \quad \text{Formula 17}$$

where μ indicates a standard deviation related to the access load of the ith storage device, $T_{Disk\ i}$ indicates the access load of the ith storage device, and $T_{Disk\ average}$ indicates an average value of the access loads of the multiple storage devices.

$$\delta = \frac{\sqrt{\sum_{i=0}^{M-1}(\lambda_{W,Disk\ i} \cdot W_{Disk\ i} - W_{Disk\ average})^2}{M-1}}}{W_{Disk\ average}} \quad \text{Formula 18}$$

where δ indicates a standard deviation related to the wear degree of the ith storage device, $W_{Disk\ i}$ indicates the access load of the ith storage device, and $W_{Disk\ average}$ indicates an average value of the wear degrees of the multiple storage devices.

According to an example implementation of the present disclosure, the overall balance index of the storage system may be determined based on the following Formula 19.

$$\text{Total} = \omega_\gamma \cdot \lambda + \omega_T \cdot \mu + \omega_W \cdot \delta \quad \text{Formula 19}$$

Scores related to the correlation, the access load, and the wear degree after the stripes are created can be determined based on Formulas 16 to 18 described above, respectively. Specifically, in the initial stage, the scores related to the correlation, the access load, and the wear degree are 57.35%, 50.81%, and 28.66%, respectively; after stripe 1 is created, the three scores are 43.40%, 28.32%, and 26.93%, respectively; after stripe 2 is created, the three scores are 44.65%, 24.14%, and 25.51%, respectively; after stripe 3 is created, the three scores are 35.20%, 27.60%, and 23.52%, respectively; and after stripe 4 is created, the three scores are 32.53%, 23.29% and 23.45% respectively.

Figure 9:
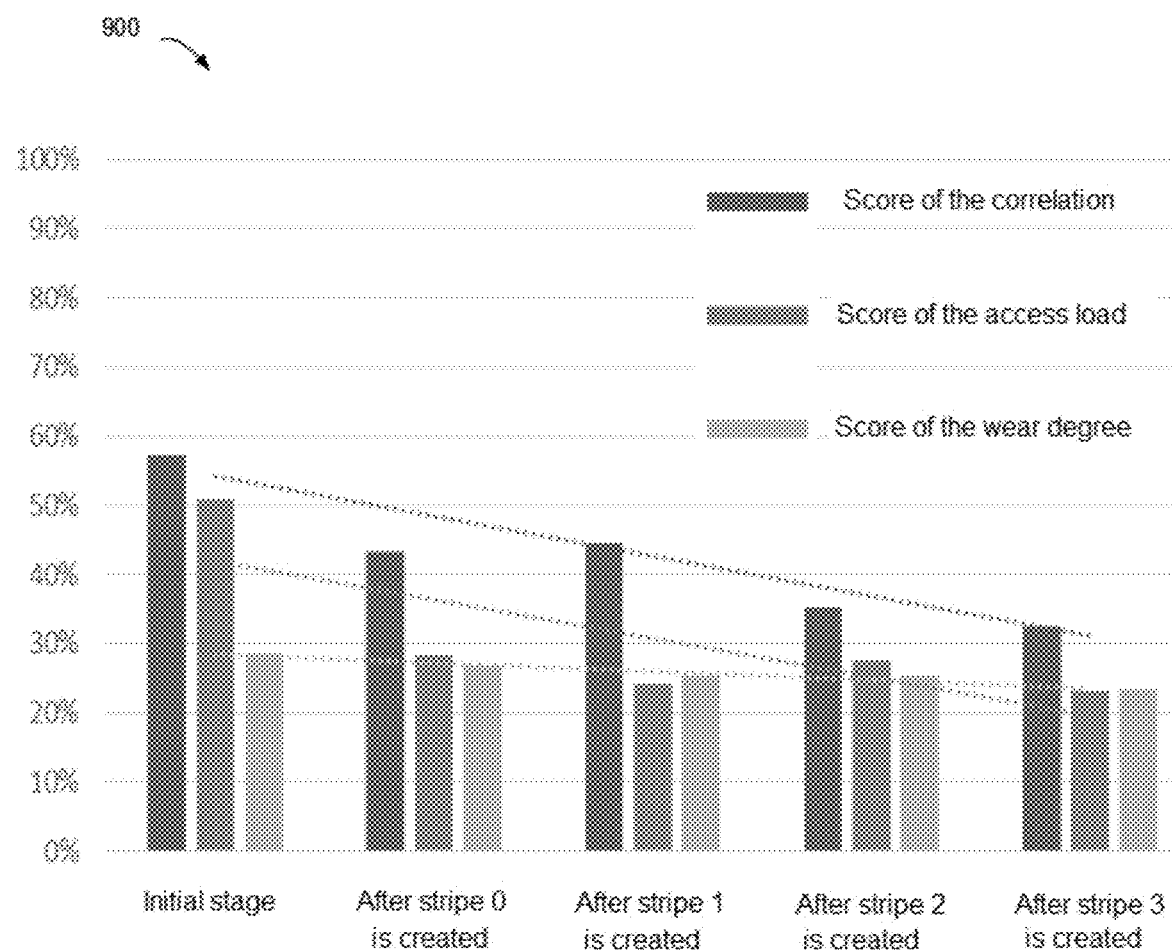
FIG. 9 schematically illustrates a block diagram of the change in scores of the storage system after each stripe is created according to an implementation of the present disclosure.

FIG. 9 schematically illustrates block diagram 900 of the change in scores of the storage system after each stripe is created according to an implementation of the present disclosure. As shown in FIG. 9, with the creation of various stripes, the scores of the storage system gradually decrease, that is, the distribution of data in the storage system is changing towards a direction of being more uniform.

An example of a method according to the present disclosure has been described in detail above with reference to FIGS. 2 to 9, and implementations of a corresponding apparatus will be described below. According to an example implementation of the present disclosure, an apparatus for creating a stripe in a storage system is provided. The storage system includes multiple storage devices, and the apparatus includes: a balance index determination module configured to determine a balance index of a storage device in the multiple storage devices, wherein the balance index indicates a relationship between the state distribution of a set of stripes which have been allocated for use in the storage device and the state distribution of a set of stripes which have been allocated for use in the multiple storage devices; an influence factor determination module configured to determine, according to attributes of the storage device in the multiple storage devices, an influence factor for the balance index of the storage device in the multiple storage devices; a selection module configured to select, based on the determined balance index and the determined influence factor, a storage device in the multiple storage devices for creating a stripe; and an adding module configured to add one extent in the selected storage device to the stripe.

According to an example implementation of the present disclosure, the apparatus further includes modules for performing method 500 described above.

Figure 10:
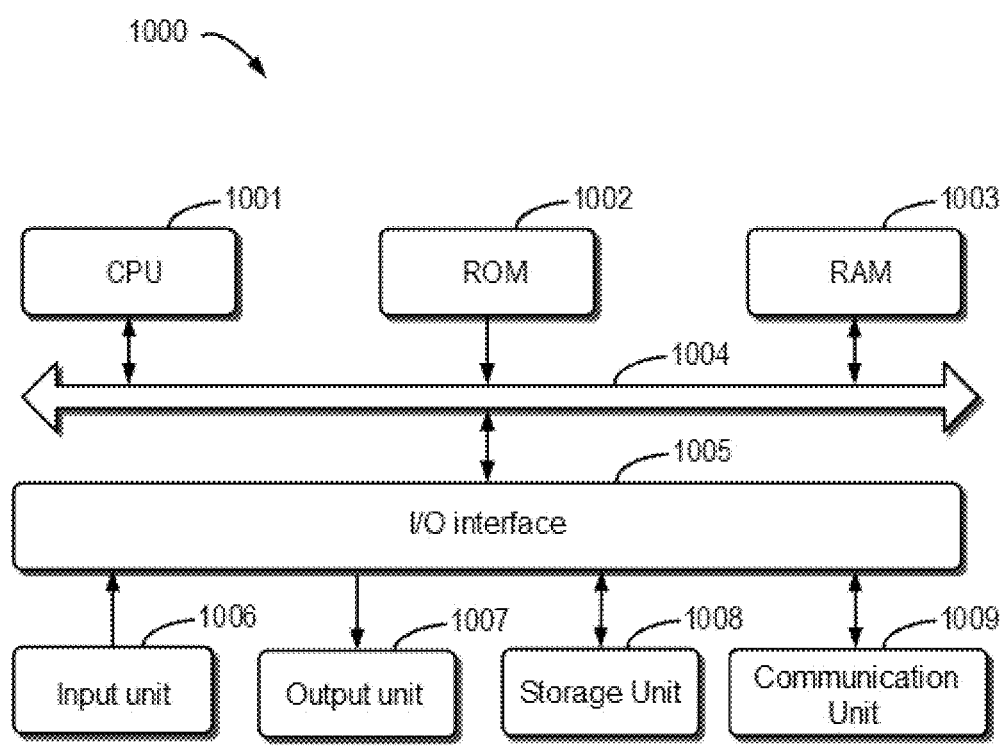
FIG. 10 schematically illustrates a block diagram of a device for creating a stripe in a storage system according to an example implementation of the present disclosure.

FIG. 10 schematically illustrates a block diagram of device 1000 for managing stripes in a storage system according to an example implementation of the present disclosure. As shown in the drawing, device 1000 includes central processing unit (CPU) 1001 that may perform various appropriate actions and processing according to computer program instructions stored in read-only memory (ROM) 1002 or computer program instructions loaded from storage unit 1008 into random access memory (RAM) 1003. In RAM 1003, various programs and data required for the operation of storage device 1000 may also be stored. CPU 1001, ROM 1002, and RAM 1003 are connected to each other via bus 1004. Input/output (I/O) interface 1005 is also connected to bus 1004.

Multiple components in device 1000 are connected to I/O interface 1005, including: input unit 1006, such as a keyboard and a mouse; output unit 1007, such as various types of displays and speakers; storage unit 1008, such as a magnetic disk and an optical disc; and communication unit 1009, such as a network card, a modem, and a wireless communication transceiver. Communication unit 1009 allows device 1000 to exchange information/data with other devices over a computer network such as the Internet and/or various telecommunication networks.

The processes and processing described above, such as method 500, may be performed by CPU 1001. For example, in some implementations, method 500 may be implemented as a computer software program that is tangibly contained in a machine-readable medium, such as storage unit 1008. In some implementations, some or all of the computer program may be loaded and/or installed onto device 1000 via ROM 1002 and/or communication unit 1009. When the computer program is loaded to RAM 1003 and executed by CPU 1001, one or more steps of method 500 described above may be performed. Alternatively, in other implementations, CPU 1001 may also be configured in any other suitable manner to implement the above-mentioned processes/methods.

According to an example implementation of the present disclosure, an electronic device is provided, including: at least one processor; and a memory coupled to the at least one processor and having instructions stored therein, wherein the instructions, when executed by the at least one processor, cause the device to perform an action for managing stripes in a storage system. The storage system includes multiple storage devices, and the action includes: determining a balance index of a storage device in the multiple storage devices, wherein the balance index indicates a relationship between the state distribution of a set of stripes which have been allocated for use in the storage device and the state distribution of a set of stripes which have been allocated for use in the multiple storage devices; determining, according to attributes of the storage device in the multiple storage devices, an influence factor for the balance index of the storage device in the multiple storage devices; selecting, based on the determined balance index and the determined influence factor, a storage device in the multiple storage devices in creating a stripe; and adding one extent in the selected storage device to the stripe.

According to an example implementation of the present disclosure, the attributes of the storage device include a storage capacity of the storage device, wherein determining the influence factor includes: determining the influence factor based on a ratio between the storage space of the storage device and the storage space of other storage devices in the multiple storage devices.

According to an example implementation of the present disclosure, the attributes of the storage device include a type of data stored in the storage device, the type including at least any one of a user data type and a system data type, wherein determining the influence factor further includes: amplifying the influence factor according to a determination that the type of the storage device is the system data type.

According to an example implementation of the present disclosure, amplifying the influence factor includes: amplifying the influence factor based on a ratio between the storage space of the storage device and a portion of the storage device that can be used to store user data.

According to an example implementation of the present disclosure, determining the balance index of the storage device includes: determining a device correlation of the storage device, wherein the device correlation indicates the distribution of the set of stripes that have been allocated for use in the storage system in the storage device and storage devices other than the storage device; determining the device correlations of the multiple storage devices, respectively; and determining the balance index of the storage device based on the device correlation of the storage device and the device correlations of the multiple storage devices.

According to an example implementation of the present disclosure, determining the balance index of the storage device further includes: determining an access load of the storage device; determining access loads of the multiple storage devices, respectively; and updating the balance index of the storage device based on the access load of the storage device and the access loads of the multiple storage devices.

According to an example implementation of the present disclosure, determining the balance index of the storage device further includes: determining a wear degree of the storage device; determining wear degrees of the multiple storage devices, respectively; and updating the balance index of the storage device based on the wear degree of the storage device and the wear degrees of the multiple storage devices.

According to an example implementation of the present disclosure, selecting the storage device from the multiple storage devices includes: selecting a first storage device according to a determination that a first balance index of the first storage device in the multiple storage devices is lower than a second balance index of a second storage device in the multiple storage devices.

According to an example implementation of the present disclosure, the action further includes: determining, for a first set of storage devices, which do not include any extent of the strip, in the multiple storage devices, a stripe balance index of a given storage device in the first set of storage devices with respect to the stripe; selecting a storage device from the first set of storage devices based on the determined stripe balance index; and adding one extent in the selected storage device to the stripe.

According to an example implementation of the present disclosure, determining the stripe balance index between the given storage device and the stripe includes: determining, in the multiple storage devices, a second set of storage devices that respectively include extents in the stripe; and determining, based on the balance index between the given storage device and each storage device in the second set of storage devices, the stripe balance index of the given storage device with respect to the stripe.

According to an example implementation of the present disclosure, selecting the storage device from the first set of storage devices based on the determined stripe balance index includes: selecting the first storage device according to a determination that a first stripe balance index of the first storage device in the first set of storage devices is lower than a second stripe balance index of the second storage device in the first set of storage devices.

According to an example implementation of the present disclosure, selecting, based on the determined stripe correlation, the storage device in the first set of storage devices includes: selecting the storage device based on the stripe balance index and the balance index of the storage device.

According to an example implementation of the present disclosure, determining the stripe balance index further includes: determining the stripe balance index of the given storage device with respect to the stripe according to a determination that the number of extents in the stripe does not satisfy the width of the stripe.

According to an example implementation of the present disclosure, a computer program product is provided, which is tangibly stored on a non-transitory computer-readable medium and includes machine-executable instructions that are used to perform the method according to the present disclosure.

According to an example implementation of the present disclosure, a computer-readable medium is provided. The computer-readable medium stores machine-executable instructions that, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals per se, such as radio waves or other freely propagating electromagnetic waves, electromagnetic waves propagating through waveguides or other transfer media (for example, optical pulses through fiber-optic cables), or electrical signals transmitted through electrical wires.

The computer-readable program instructions described herein may be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be completely executed on a user's computer, partially executed on a user's computer, executed as a separate software package, partially executed on a user's computer and partially executed on a remote computer, or completely executed on a remote computer or a server. In cases where a remote computer is involved, the remote computer may be connected to a user's computer over any kind of networks, including a local area network (LAN) or a wide area network (WAN), or may be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to implementations of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or another programmable data processing apparatus, produce a means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flowcharts and/or block diagrams.

The computer-readable program instructions may also be loaded onto a computer, another programmable data processing apparatus, or another device, so that a series of operating steps may be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of systems, methods, and computer program products according to multiple implementations of the present disclosure. In this regard, each block in the flowcharts or block diagrams may represent a module, a program segment, or a part of an instruction that contains one or more executable instructions for implementing specified logical functions. In some alternative implementations, functions labeled in the blocks may also occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various embodiments of the present disclosure have been described above. The above description is illustrative and not exhaustive, and is not limited to the various embodiments disclosed. Many modifications and variations will be apparent to those of ordinary skill in the art without departing from the scope and spirit of the illustrated various embodiments. The selection of terms as used herein is intended to best explain the principles and practical applications of the various implementations or the improvements to technologies on the market, and to otherwise enable persons of ordinary skill in the art to understand the illustrative embodiments disclosed herein.

What is claimed is:

1. A method for creating a new stripe in a storage system which comprises multiple storage devices, the method comprising:
    determining a balance index of a first storage device in the multiple storage devices, wherein the balance index indicates a relationship between the state distribution of a first set of stripes which have been allocated for use in the first storage device and the state distributions of other sets of stripes which have been allocated for use in other ones of the storage devices in the multiple storage devices;
    determining, according to attributes of the first storage device in the multiple storage devices, an influence factor for the balance index of the first storage device in the multiple storage devices;

selecting, based at least in part on the determined balance index and the determined influence factor, one of the storage devices from the multiple storage devices for creating the new stripe; and adding one extent in the selected storage device to the new stripe;

wherein the balance index of the first storage device is determined based at least in part on correlations between the first storage device and each of one or more of the other ones of the storage devices in the multiple storage devices, the correlation between the first storage device and a given other one of the storage devices in the multiple storage devices being based at least in part on a number of stripes in the storage system that utilize both the first storage device and the given other storage device.

2. The method according to claim 1, wherein the attributes of the first storage device comprise a storage capacity of the first storage device, and determining the influence factor comprises: determining the influence factor based at least in part on a ratio between the storage capacity of the first storage device and storage capacities of the one or more of the other ones of the storage devices in the multiple storage devices.

3. The method according to claim 2, wherein the attributes of the first storage device comprise a type of data stored in the first storage device, the type of data stored in the first storage device comprising at least one of a user data type and a system data type, and determining the influence factor further comprises: amplifying the influence factor according to a determination that the type of data stored in the first storage device is the system data type.

4. The method according to claim 3, wherein amplifying the influence factor comprises: amplifying the influence factor based at least in part on a ratio between the storage capacity of the first storage device and a portion of the storage capacity of the first storage device that can be used to store user data.

5. The method according to claim 1, wherein determining the balance index of the first storage device comprises:
determining the device correlation of the first storage device;
determining device correlations of the one or more of the other ones of the storage devices in the multiple storage devices, respectively; and
determining the balance index of the first storage device based at least in part on the device correlation of the first storage device and the device correlations of the one or more of the other ones of the storage devices in the multiple storage devices.

6. The method according to claim 5, wherein determining the balance index of the first storage device further comprises:
determining an access load of the first storage device;
determining access loads of the one or more of the other ones of the storage devices in the multiple storage devices, respectively; and
updating the balance index of the first storage device based at least in part on the access load of the first storage device and the access loads of the one or more of the other ones of the storage devices in the multiple storage devices.

7. The method according to claim 5, wherein determining the balance index of the first storage device further comprises:

determining a wear degree of the first storage device;
determining wear degrees of the one or more of the other ones of the storage devices in the multiple storage devices, respectively; and
updating the balance index of the first storage device based at least in part on the wear degree of the first storage device and the wear degrees of the one or more of the other ones of the storage devices in the multiple storage devices.

8. The method according to claim 1, wherein selecting one of the storage devices from the multiple storage devices comprises:
selecting the first storage device according to a determination that the balance index of the first storage device is lower than a balance index of a second storage device in the multiple storage devices.

9. The method according to claim 1, further comprising:
determining, for a first set of the storage devices in the multiple storage devices which do not comprise any extent of the new stripe, a stripe balance index of a given one of the storage devices in the first set of storage devices with respect to the new stripe;
selecting, based at least in part on the determined stripe balance index, one of the storage devices in the first set of storage devices; and
adding one extent in the selected storage device in the first set of storage devices to the new stripe.

10. The method according to claim 9, wherein determining the stripe balance index of the given storage device in the first set of storage devices with respect to the new stripe comprises:
determining, in the multiple storage devices, a second set of storage devices that respectively comprise extents in the new stripe; and
determining, based at least in part on a balance index between the given storage device in the first set of storage devices and each storage device of the second set of storage devices, the stripe balance index of the given storage device in the first set of storage devices with respect to the new stripe.

11. The method according to claim 10, wherein selecting, based at least in part on the determined stripe balance index, said one of the storage devices in the first set of storage devices comprises:
selecting said one of the storage devices in the first set of storage devices according to a determination that a first stripe balance index of said one of the storage devices in the first set of storage devices is lower than a second stripe balance index of at least one other storage device in the first set of storage devices.

12. The method according to claim 10, wherein selecting, based at least in part on the determined stripe balance index, said one of the storage devices in the first set of storage devices comprises:
selecting said one of the storage devices in the first set of storage devices based at least in part on the determined stripe balance index and a balance index of said one of the storage devices in the first set of storage devices.

13. The method according to claim 10, wherein determining the stripe balance index further comprises:
determining the stripe balance index of the given one of the storage devices in the first set of storage devices with respect to the new stripe according to a determination that thea number of extents in the new stripe does not satisfy a width of the new stripe.

14. An electronic device, comprising:

at least one processor; and a memory coupled to the at least one processor, wherein the memory has instructions stored therein which, when executed by the at least one processor, cause the device to perform an action for creating a new stripe in a storage system comprising multiple storage devices, the action comprising:

determining a balance index of a first storage device in the multiple storage devices, wherein the balance index indicates a relationship between the state distribution of a first set of stripes which have been allocated for use in the first storage device and the state distributions of other sets of stripes which have been allocated for use in other ones of the storage devices of the multiple storage devices;

determining, according to attributes of the first storage device in the multiple storage devices, an influence factor for the balance index of the first storage device in the multiple storage devices;

selecting, based at least in part on the determined balance index and the determined influence factor, one of the storage devices from the multiple storage devices for creating the new stripe; and adding one extent in the selected storage device to the new stripe;

wherein the balance index of the first storage device is determined based at least in part on correlations between the first storage device and each of one or more of the other ones of the storage devices in the multiple storage devices, the correlation between the first storage device and a given other one of the storage devices in the multiple storage devices being based at least in part on a number of stripes in the storage system that utilize both the first storage device and the given other storage device.

15. The device according to claim 14, wherein the attributes of the first storage device comprise a storage capacity of the first storage device, and determining the influence factor comprises: determining the influence factor based at least in part on a ratio between the storage capacity of the first storage device and storage capacities of the one or more of the other ones of the storage devices in the multiple storage devices.

16. The device according to claim 15, wherein the attributes of the first storage device comprise a type of data stored in the first storage device, the type of data stored in the first storage device comprising at least one of a user data type and a system data type, and determining the influence factor further comprises: amplifying the influence factor according to a determination that the type of data stored in the first storage device is the system data type.

17. The device according to claim 16, wherein amplifying the influence factor comprises: amplifying the influence factor based at least in part on a ratio between the storage capacity of the first storage device and a portion of the storage capacity of the first storage device that can be used to store user data.

18. The device according to claim 14, wherein determining the balance index of the first storage device comprises:

determining the device correlation of the first storage device;

determining device correlations of the one or more of the other ones of the storage devices in the multiple storage devices, respectively; and determining the balance index of the first storage device based at least in part on the device correlation of the first storage device and the device correlations of the one or more of the other ones of the storage devices in the multiple storage devices.

19. The device according to claim 18, wherein determining the balance index of the first storage device further comprises:

determining an access load of the first storage device;

determining access loads of the one or more of the other ones of the storage devices in the multiple storage devices, respectively; and updating the balance index of the first storage device based at least in part on the access load of the first storage device and the access loads of the one or more of the other ones of the storage devices in the multiple storage devices.

20. A computer program product tangibly stored on a non-transitory computer-readable medium and comprising machine-executable instructions, wherein the machine-executable instructions are used to perform a method for creating a stripe in a storage system which comprises multiple storage devices, the method comprising:

determining a balance index of a first storage device in the multiple storage devices, wherein the balance index indicates a relationship between the state distribution of a first set of stripes which have been allocated for use in the first storage device and the state distributions of other sets of stripes which have been allocated for use in other ones of the storage devices in the multiple storage devices;

determining, according to attributes of the first storage device in the multiple storage devices, an influence factor for the balance index of the first storage device in the multiple storage devices;

selecting, based at least in part on the determined balance index and the determined influence factor, one of the storage devices from the multiple storage devices for creating the new stripe; and adding one extent in the selected storage device to the new stripe;

wherein the balance index of the first storage device is determined based at least in part on correlations between the first storage device and each of one or more of the other ones of the storage devices in the multiple storage devices, the correlation between the first storage device and a given other one of the storage devices in the multiple storage devices being based at least in part on a number of stripes in the storage system that utilize both the first storage device and the given other storage device.

* * * * *